(12) United States Patent
Yamashita et al.

(10) Patent No.: US 7,459,107 B2
(45) Date of Patent: Dec. 2, 2008

(54) TWO-PACK URETHANE FOAM COMPOSITION, AND TWO-PACK URETHANE FOAM COMPOSITION INJECTING APPARATUS AND METHOD

(75) Inventors: Kiichi Yamashita, Hyogo (JP); Tatsuya Wakamori, Hyogo-ken (JP); Masahito Mori, Osaka (JP); Mutsuhisa Miyamoto, Osaka (JP)

(73) Assignee: Sunstar Suisse SA, Ecublens (CH)

( * ) Notice: Subject to any disclaimer, the term of this patent is extended or adjusted under 35 U.S.C. 154(b) by 568 days.

(21) Appl. No.: 11/025,152

(22) Filed: Dec. 30, 2004

(65) Prior Publication Data
US 2005/0146067 A1     Jul. 7, 2005

Related U.S. Application Data

(62) Division of application No. 09/986,675, filed on Nov. 9, 2001, now Pat. No. 6,866,804, which is a division of application No. 09/355,035, filed as application No. PCT/JP98/00269 on Jan. 23, 1998, now Pat. No. 6,337,355.

(30) Foreign Application Priority Data

| Jan. 23, 1997 | (JP) | ............................... 1997-10021 |
| Jan. 31, 1997 | (JP) | ............................... 1997-18485 |
| Jul. 11, 1997 | (JP) | ............................... 1997-186423 |
| Jul. 14, 1997 | (JP) | ............................... 1997-188226 |
| Oct. 1, 1997 | (JP) | ............................... 1997-268580 |
| Oct. 24, 1997 | (JP) | ............................... 1997-292127 |

(51) Int. Cl.
*B29C 44/12* (2006.01)

(52) U.S. Cl. .................... 264/40.1; 264/46.5; 264/46.6

(58) Field of Classification Search ................ 364/40.1, 364/46.5, 46.6
See application file for complete search history.

(56) References Cited

U.S. PATENT DOCUMENTS

| 2,574,391 | A | * | 11/1951 | Herrly ........................ 425/4 R |
| 3,369,336 | A | * | 2/1968 | Buzicky ..................... 52/302.3 |
| 3,915,438 | A | | 10/1975 | Neiley, Jr. et al. |
| 4,277,571 | A | | 7/1981 | Falkenstein et al. |
| 4,381,352 | A | | 4/1983 | McBrayer |

(Continued)

FOREIGN PATENT DOCUMENTS

GB         1 534 258         11/1978

(Continued)

*Primary Examiner*—Suzanne E. McDowell
(74) *Attorney, Agent, or Firm*—Wenderoth, Lind & Ponack, L.L.P.

(57) ABSTRACT

A process of reinforcing a closed sectional portion of a vehicle body with a two-pack urethane foam composition. The process including the operations of injecting a two-pack urethane foam composition into the closed sectional portion of a vehicular body member; foaming and curing the two-pack urethane foam composition within said closed sectional portion; and then viewing the cured urethane foam-filling confirming opening to confirm whether the closed sectional portion has been sufficiently filled by the two-pack urethane foam composition. The closed sectional portion has a cured urethane foam-filling confirming opening, which is a hole extending through a wall of the closed sectional portion, The opening dimension of the cured urethane foam-filling confirming opening is 10 mm or less in order to assure rigidity of the vehicular body member.

9 Claims, 18 Drawing Sheets

U.S. PATENT DOCUMENTS

| | | | |
|---|---|---|---|
| 4,386,166 A | 5/1983 | Peterson et al. | |
| 4,469,653 A | 9/1984 | Nissen et al. | |
| 4,510,120 A | 4/1985 | Bauer | |
| 4,964,362 A | 10/1990 | Dominguez | |
| 5,160,465 A * | 11/1992 | Soderberg | 264/46.5 |
| 5,482,979 A | 1/1996 | Sanders et al. | |
| 5,804,110 A | 9/1998 | Guilmette | |

FOREIGN PATENT DOCUMENTS

| | | |
|---|---|---|
| JP | 52-38577 | 3/1977 |
| JP | 57-182411 | 11/1982 |
| JP | 59-212236 | 12/1984 |
| JP | 62-169816 | 7/1987 |
| JP | 01-068649 | 3/1989 |
| JP | 64-068649 | 3/1989 |
| JP | 1-145110 | 6/1989 |
| JP | 1-198313 | 8/1989 |
| JP | 3-55217 | 3/1991 |
| JP | 3-64718 | 6/1991 |
| JP | 04-089216 | 3/1992 |
| JP | 4-299108 | 10/1992 |
| JP | 7-58137 | 3/1995 |
| JP | 7-21310 | 4/1995 |
| JP | 7-137062 | 5/1995 |
| JP | 08-059783 | 3/1996 |
| JP | 8-155974 | 6/1996 |
| JP | 64-68649 | 3/1998 |
| JP | 10-175227 | 6/1998 |
| WO | 96/11095 | 4/1996 |

* cited by examiner

Fig. 1
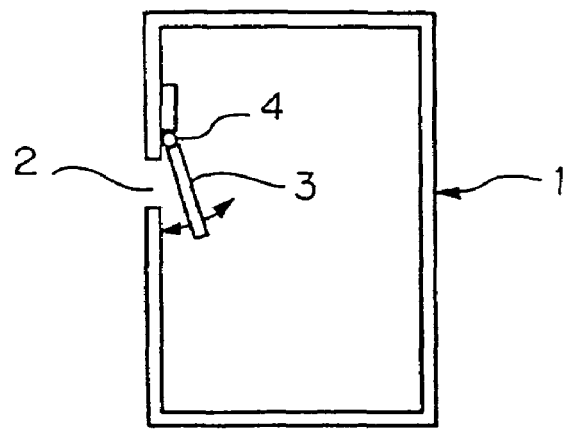
Fig. 2
(A)
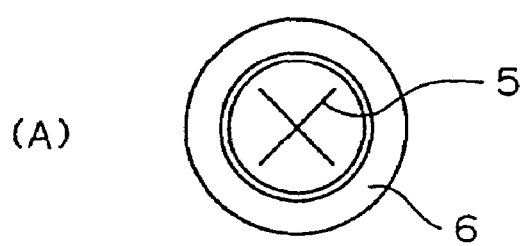
(B)
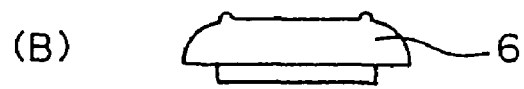

TWO-PACK URETHANE FOAM COMPOSITION, AND TWO-PACK URETHANE FOAM COMPOSITION INJECTING APPARATUS AND METHOD

This application is a divisional of U.S. application Ser. No. 09/986,675, now U.S. Pat. No. 6,866,804 filed Nov. 9, 2001, which is a divisional of U.S. application Ser. No. 09/355,035, filed Jul. 22, 1999, which is a National Stage application of PCT/JP98/00269, filed Jan. 23, 1998, now U.S. Pat. No. 6,337,355.

BACKGROUND OF THE INVENTION

The present invention relates to aspects of an invention associated with a two-pack urethane foam composition for reinforcing a closed sectional structure of the body of a vehicle, e.g., automobile, by filling a urethane foam, by injecting the two-pack urethane foam composition, into the closed sectional structure thereof.

More particularly, one aspect of the invention relates to a two-pack urethane foam composition which is composed of a two pack of a polyol compound as a major component and a polyisocyanate compound as a curing agent, and which can form a urethane foam by foaming and curing upon injecting (applying) immediately after mixing the two components at ambient temperature. On the other hand, other aspects of the invention relate to an injection method for injecting the two-pack urethane foam composition, a cured urethane foam-filled vehicle body member having an opening for confirming the injecting and filling of the two-pack urethane foam composition, a cured urethane foam-filling confirming method for confirming the appropriateness of a filling volume of the two-pack urethane foam composition, and a two-pack urethane foam composition injecting apparatus and method capable of automatically injecting and filling the two-pack urethane foam composition into the closed sectional structure of the vehicle body.

In recent years, the automobile industry has been required to ensure the rigidity of an entire vehicle body for increasing the safety of automobiles and improving a soundproof property of a riding space. In order to achieve these requirements, demands have been made to provide the intensity and the rigidity and the soundproof property to a portion where a variety of loads such as impact and so on are imposed, such as a center pillar having a closed sectional structure, a front pillar of a vehicle body having a closed sectional structure and so on. Moreover, in order to protect riders from impact, a crushable zone has to be provided on each of the front and rear sides of the vehicle body and a solid safety cell has to be configured for a cabin where the riders are seated in order to ensure a riding space for the riders.

On the other hand, problems may arise in that the weight of the vehicle body is increased and the fuel economy becomes poorer if a thick panel is used as each of the pillar, chassis or the like having a closed sectional structure in order to improve the rigidity and the soundproof property of the cabin.

Therefore, it has been suggested to develop structures and methods for increasing the rigidity of the vehicle body while keeping the thick panel of the pillar of the vehicle body and so on thin, for instance, by injecting and filling a cured urethane foam into the closed sectional structure of the pillar thereof and so on by using the above two-pack urethane foam composition. In combination of development of making the vehicle body lightweight, it has also been considered to inject and fill a urethane foam into a closed sectional structure of a roof portion or a locker portion or the like, in addition to the pillar and so on.

Various problems, however, may result in injecting the two-pack urethane foam composition into the closed sectional structure.

For instance, when the two-pack urethane foam composition is injected in a fluid state, there are occasions that the injected composition leaks outside or expands from the injection port due to a back flow. The injected composition leaks or expands even from a small gap of the closed sectional structure so that there is the risk that the appearance of the automobile may be impaired (hereinafter referred to as the first problem).

It has now been found by the present inventors that the two-pack urethane foam composition does not leak or expand from small gaps in an injecting portion, if any, due to becoming cured to an appropriate level of viscosity immediately after injection by limiting foaming characteristics of the two-pack urethane foam composition, particularly a cream time and a rise time, as well as adjusting the specific gravity of the filled urethane foam to become 0.6 to 0.01 by adjusting the amount of the foaming agent.

When such a two-pack urethane foam composition of a curable type having a high reactivity at ambient temperature (0° C.-50° C.) is used, it has been found to raise a practically significant problem that, when it is discharged or injected from a conventional two-pack mixing apparatus, there are occasions in which the two-pack urethane foam composition cures in the mixing apparatus during injecting on site, and thus clogs the mixing apparatus during the injecting process (hereinafter referred to as the second problem).

It is designed as a matter of course to inject a predetermined amount of the two-pack urethane foam composition, corresponding to the volume of the closed sectional structure to be injected and filled with the composition, with a foaming rate and other foaming conditions of the two-pack urethane foam composition taken into account. If an unpredictable problem would occur with an injecting apparatus or the like; however, there may result an unpredictable occasion that the filling volume of the cured urethane foam becomes less than the desired range and a hollow portion may result, thereby making it difficult to reach the designed rigidity. It is considered that the lack of the filling volume may also arise due to accidental damage of a partition plate disposed in the closed sectional structure.

In actual cases, however, the present situation resides in that there is no manner of preventing the lack of such filling volume of the urethane foam in advance, and that the appropriateness or inappropriateness of the filling volume can be judged for the first time by carrying out impact tests or by measuring the rigidity of an actual car or analyzing the vibration thereof after the production line. Therefore, the problem is that the design intensity and rigidity of the automobile cannot be ensured during the production line (hereinafter referred to as the third problem).

Furthermore, in general, the production of automobiles is carried out by mass production by the transfer and assembly method using a belt conveyor on the basis of the division of work. In order to adapt a production line to such a mass production, however, it is required to develop an injecting apparatus and an injecting method for injecting and filling a two-pack urethane foam composition into the closed sectional structure of the vehicle body (hereinafter referred to as the fourth problem).

OBJECTS OF THE INVENTION

The present invention has been completed with the foregoing facts taken into account and has the major object to solve the various problems that may arise upon injecting and filling a two-pack urethane foam composition into a structural member to be injected and filled, such as a closed sectional structure of a vehicle body, etc.

More specifically, the present invention in one aspect has objects to provide a two-pack urethane foam composition and an injection method for injecting the two-pack urethane foam composition, which can prevent the injected composition from being leaked outside or expanding from the inside due to a back flow of the injected composition, upon injecting the two-pack urethane foam composition into the structural member to be injected and filled.

In another aspect, the present invention has an object to provide an injection process for injecting the two-pack urethane foam composition in the structural member to be injected and filled, which can inject it into the structural member in a smooth way completely without causing clogging as well as which does not cause the injected composition from being leaked outside and expanding due to a back flow thereof upon injection of the composition into the structural member.

Moreover, in a further aspect, the present invention has other objects to provide a cured urethane foam-filled vehicle body member, an injecting method for injecting and filling the cured urethane foam into the vehicle body member, and a cured urethane foam-filled confirming method for confirming the filling of a cured urethane foam therein, which can confirm the appropriateness of the filling volume so as to adapt to the volume of the inside of the closed sectional structure of the vehicle body, upon injecting the two-pack urethane foam composition into the closed sectional portion thereof having a closed sectional structure and injecting and filling the closed sectional structure with the cured urethane foam by foaming and curing the two-pack urethane foam composition.

Furthermore, the present invention has still further objects to provide a injecting apparatus and a injecting method for injecting and filling the two-pack urethane foam composition in the closed sectional structure of the vehicle body, which are adapted to a mass production of vehicles including, e.g., automobiles.

FEATURES OF THE INVENTION (Injection Method for Injecting Two-Pack Urethane Foam Composition)

In order to solve the first problem as described above, the present inventors have made extensive review and studies with the attempt to solve the problems associated with the leakage of the two-pack urethane foam composition outside and expanding due to a back flow thereof upon injecting the two-pack urethane foam composition into an injection port of a structural member to be injected and filled, which is not limited to and includes a closed sectional structure of a pillar portion of the vehicle body member. As a result of such extensive review and studies, it has been found that the above objects can be achieved by providing a unique injection port for injecting the two-pack urethane foam composition, or providing a portion in the vicinity of the injection port. Therefore, this invention has been completed on the basis of this finding.

More specifically, in order to prevent the once injected composition from leaking and expanding outside from the injection port of the structural member that has been injected and filled during the injecting method with the two-pack urethane foam composition, which foams and cures therein, the present invention provides the injection method for injecting the two-pack urethane foam composition, characterized in that: (i) a shut-off plate for the injection port is mounted on the inner side of the structural member to be injected and filled so as to open or close the injection port; (ii) a rubber-formed member having a cross cut portion is inserted into the injection port so as to open or close the injection port; or (iii) a check valve that allows a fluid to pass only in one direction is mounted on the injection port.

(Two-Pack Urethane Foam Composition for Urethane Foam)

With the requirements for the reinforcement of the rigidity inside the such pillars and improvements in soundproof properties taken into account, the present inventors have made extensive review and studies on the two-pack urethane foam compositions having excellent properties in foaming and curing, by focusing on the first problem resulting from the properties of the two-pack urethane foam composition itself. This can solve the first problem and meet the requirements of the automobile industry, as well as provide a high level of efficiency in injection of a closed sectional structure and a high degree of rigidity and excellent soundproof properties. As a result, the following findings have been made.

It has first been found that, even if there would be used a foaming agent of a curable type under ambient temperature conditions, which can generally generate gases under thermal conditions, in place of a foaming agent of a type that has usually been used conventionally under ambient temperature conditions (such as water or of a hydrogen-containing halogenated hydrocarbon type or of a low-boiling temperature hydrocarbon type, etc.), the urethane foam can be formed upon mixing the two-pack urethane foam composition at ambient temperature by allowing the foaming agent to work at a sufficiently high level by the reaction heat produced upon an instantaneous reaction between the polyol compound as the major component (a) with the polyisocyanate compound as the curing agent (b), and by defining the specific gravity of the cured urethane foam by adjusting the amount of the foaming agent.

In this case, too, it has been found, however, that the problem with the leakage of the injected composition still remains unsolved. Therefore, as a result of further review and studies, the present inventors have found that the addition of an amine compound of a particular weight ratio having an active hydrogen atom (—$NH_2$— or —NH—) on the main component side at a particular rate can produce an appropriate soft or hard urethane foam that can prevent the once injected composition from leaking outside and expanding through a gap due to its excessive level of viscosity and an appropriate speed of foaming and curing and that can be adapted to the purposes to achieve reinforcement performance and soundproof properties.

More specifically, the present invention has been completed on the basis of the above findings and provides a two-pack urethane foam composition for urethane foam, comprising (a) a polyol compound as a major component and (b) a polyisocyanate compound as the curing agent, which can produce a urethane foam by reaction of the two components in the presence of the foaming agent. The foaming agent to be used for this purpose may include a chemical foaming agent and inorganical forming agent of a thermally decomposable type, which may be used singly or as a mixture in combination of two or more kinds thereof. The amount of the foaming agent is to be adjusted so that the resulting cured urethane foam is to have a specific gravity in the range of from 0.6 to 0.1. Further, the two-pack urethane foam composition may comprise (a) the above major component and (b) the above curing agent, wherein an amine compound having a number-average molecular weight of 110 or more and at least one of an amino (—$NH_2$—) group and an imino (—NH—) group is formulated with the major component (a). The amine compound is selected so that its amino (—$NH_2$—) group and/or the imino (—NH—) group is present in an amount of from 0.05% to 3% by weight with respect to the total weight of the above major component (a) and the above curing agent (b); and the amount of the foaming agent is to be adjusted so that the resulting cured urethane foam is to have a specific gravity in the range of 0.6 to 0.01.

As the polyol compound to be used as the major component (a) for the present invention, there may preferably be used a polyether polyol which may be obtained by the additional reaction between an active hydrogen containing compound such as, for example, a poly-valent alcohol, a bisphenol, an aliphatic amine, an aromatic amine, an aliphatic amine having an aromatic ring, or an alicyclic amine, and an alkylene oxide (e.g., one or more selected from ethylene oxide, propylene oxide, butylene oxide and isobutylene oxide).

Further, it is appropriate that the polyol compound may have an average hydroxy group value in the range of, generally, from 150 to 800, preferably from 200 to 600, from the point of view of reinforcement purposes. If the average hydroxy group value of the polyol compound would be smaller than 150, a sufficiently high level of rigidity cannot be achieved. On the other hand, if the average hydroxy group value of the polyol compound would exceed 800, the resulting urethane foam may become brittle.

As the poly-valent alcohol, there may be mentioned, such as a di-valent alcohol, e.g., ethylene glycol, diethylene glycol, propylene glycol, dipropylene glycol, butane diol, pentane diol, hexane diol, neopentyl glycol, cyclohexylene glycol, etc., a tri-valent alcohol, e.g., trimethylol propane, glycerin, etc., a tetra-valent or higher-valent alcohol, e.g., pentaerythritol, sorbitol, methyl glycoside, diglycerin, sucrose, and so on.

As the bisphenol, there may be mentioned, for example, hydroquinone, 1,4-bis(hydroxyethoxy)benzene, bisphenol A, bisphenol F, bisphenol S, 4,4'-dihydroxybiphenyl, 2,2'-bis(4-hydroxyphenyl)hexafluoro-propane, and so on.

As the aliphatic amine, there may be mentioned, for example, ammonia, monoethanol amine, diethanol amine, triethanol amine, polymethylene diamine (e.g., ethylene diamine, diaminobutane, diaminopropane, hexane diamine, dodecane diamine, etc.), polyethylene polyamine (e.g., diethylene triamine, triethylene tetramine, etc.), polyether diamine, and so on.

As the aromatic amine, there may be mentioned, for example, 2,4- or 2,6-diaminotoluene (TDA), crude TDA, 1,2-, 1,3- or 1,4-phenylene diamine, diethyltolylene diamine, 4,4'-diamino diphenyl methane (MDA), crude MDA, 1,5-naphthylene diamine, 3,3'-dichloro-4,4'-diaminophenyl methane, 3,3'-dimethyl-4,4'-diaminodiphenyl cyclohexane, and so on.

As the aliphatic amine having the aromatic ring, there may be mentioned, for example, 1,2-, 1,3- or 1,4-xylene diamine, and so on.

As the alicyclic amine, there may be mentioned, for example, 4,4'-diamino dicyclohexyl methane, 3,3'-dimethyl-4,4'-diamino dicyclohexyl methane, 3-amino-1-cyclohexyl aminopropane, bis(aminomethyl)cyclohexane, isophorone diamine, norbornane diamine, menthene diamine, 3,9-bis(3-aminopropyl)-2,4,8,10-tetraoxa spiro(-5,5-)undecane, and so on.

In addition to the above polyether polyols, there may be used an oligomer having two or more hydroxy groups, such as polyester polyol (a condensed product resulting from condensation reaction between a polycarboxylic acid and a polyhydroxyl compound); a polycarbonate polyol; a polycaprolactone polyol; a polymer polyol denatured with a polybutadiene polyol, an acryl polyol, an ethylenic unsaturated monomer, etc.; and so on.

As the polycarboxylic acid to be used as a raw material for the polyester polyol, there may be mentioned, for example, adipic acid, sebacic acid, dimeric acid, phthalic anhydride, terephthalic acid, isophthalic acid, phthalic acid, trimellitic acid, pyromelic acid, and so on. As the polyhydroxyl compound, there may be illustrated, for example, the poly-valent alcohol to be used for the above polyester polyol, and the polyester polyol itself.

On the other hand, the polyisocyanate compounds as the curing agent (b) for the present invention may include, for example, an aromatic polyisocyanate; an aliphatic or alicyclic polyisocyanate; an aromatic-aliphatic polyisocyanate; a modified product thereof (such as a polyol adduct modified product, e.g., trimethylol propane, castor oil, sucrose, etc., a carbodiimide modified product, an allophanate modified product, a urea modified product, a biuret modified product, an isocyanurate modified product, an oxazolidone modified product, etc.), a urethane prepolymer having a NCO group at its terminal obtainable by the reaction of a polyol compound with an excessive amount of a polyisocyanate compound, and so on.

As the aromatic polyisocyanates, there may be mentioned, for example, 1,3- or 1,4-phenylene diisocyanate, 2,4- and/or 2,6-tolylene diisocyanate (TDI), crude TDI, diphenylmethane-2,4'- and/or -4,4'-diisocyanate (MDI), crude MDI, polymethylene polyphenyl isocyanate, naphthylene-1,5-diisocyanate, triphenylmethane-4,4',4''-triisocyanate, and so on.

As the aliphatic or alicyclic polyisocyanates, there may be mentioned, for example, isophorone diisocyanate, 1,6-hexamethylene diisocyanate, 4,4'-dicyclohexylmethane diisocyanate, 1,4-cyclohexylene diisocyanate, 2,2,4-trimethylhexamethylene diisocyanate, and so on.

As the aromatic-aliphatic polyisocyanates, there may be mentioned, for example, xylylene diisocyanate, tetramethylxylylene diisocyanate, and so on.

Among the polyisocyanates as described above, preferred examples of the polyisocyanates are MDI, crude MDI, sucrose-modified TDI, and carbodiimide-modified MDI. Most preferred one is crude MDI.

The two-pack urethane foam composition for urethane foam according to the present invention may comprise the above major component (a) (the polyol compound) and the curing agent (b) (the polyisocyanate compound), which is usually obtainable by formulating the above amine compound with the major component (a) by reacting the major component (a) in the presence of the foaming agent (in usual cases, to be added to the major component (a)) in a two-pack system to form a urethane foam.

It can be noted herein that, although the major component (a) and the curing agent (b) can be varied in mixing, the major component (a) may be selected in usual cases so that the equivalent ratio of the active hydrogen group (OH group) of the major component (a) to the NCO group of the curing agent (b) is 1:0.8-10, and preferably 1:0.9-5.

As the foaming agent to be used in the case (i) above, there may be used, for example, the chemical foaming agent of a thermally decomposable type such as, e.g., dinitroso pentamethylene tetramine (DPT), azo dicarbodiamide (ADCA), p,p'-oxy bisbenzene sulfonyl hydrazide (OBSH), p-toluene sulfonyl hydrazide (TSH), p-toluene sulfonyl acetone hydrazone, hydrazo dicarbonamide, azo bisisobutyronitrile (AIBN), and so on (these may be used together with an accessory agent of a urea type or of a metallic type); and the inorganic foaming agent of a thermally decomposable type (such as sodium hydrogen carbonate, etc., and these may be used as singly or a mixture in combination of two or more kinds). These foaming agents (hereinafter referred to as a "limited foaming agent") may be caused to decompose or expand due to the reaction heat generated by the instantaneous reaction between the major component (a) and the curing agent (b), thereby producing gases even without using a separate heating device.

In addition to the limited foaming agent, there may also be used water which has been hitherto used as a foaming agent, or a foaming agent of a hydrogen-containing halogenated hydrocarbon type or a foaming agent of a low-boiling point hydrocarbon type (hereinafter referred to as a "conventional foaming agent").

When these foaming agents are used, it is of significance that the amount to be used, regardless of their kinds, may be adjusted so that a specific gravity of a cured urethane foam resulting therefrom is in the range of from 0.6 to 0.01, preferably from 0.5 to 0.03. If the foaming agent would be used in the amount so that the specific gravity of the resulting urethane foam exceeds 0.6, the composition cannot be injected and filled in every corner of a closed sectional structure, thereby failing to contribute to a reduction of costs and a decrease in the weight of the structural member. If the foaming agent would be used in the amount so that the specific gravity of the resulting urethane foam becomes smaller than 0.01, the cured urethane foam injected and filled in the closed sectional structure is likely to be damaged, thereby failing to achieve the purposes of reinforcement and performance of soundproof properties. It is preferred to adjust the amount of the foaming agent so that the specific gravity of the resulting urethane foam is in the range of 0.5 to 0.01 for achieving the purposes of reinforcement, on the one hand, and is in the range of 0.4 to 0.03 for performing the purposes of soundproof properties, on the other hand.

As the amine compounds to be used in the case (ii) above, there may be used the amine compound having at least one of the amino group ($-NH_2$) and the imino group ($-NH-$), having an average molecular weight of 110 or more, preferably from 120 to 5,000, more preferably from 120 to 1,000, especially from 120 to 500. The amine compounds may be selected from a polyamide and a modified product resulting therefrom, which may be obtained by the condensation reaction between the aliphatic amine, aromatic amine or alicyclic amine or an amine thereof, as illustrated as a raw material for the polyether polyol, and the polycarboxylic acid illustrated as a raw material for the polyether polyol. An alkylene oxide adduct of these amine compounds may also be used.

It is also of significance that the amount of the amine compound to be added may be adjusted so that the amino group ($-NH-2$) and/or the imino group ($-NH-$) is present in the amine compound in an amount of from 0.05 to 3% by weight, preferably from 0.1 to 1% by weight, with respect to the total amount of the major component (a) and the curing agent (b). If the amount of the amino and/or imino groups is less than 0.05% by weight, the two-pack urethane foam composition may not achieve the effect of preventing the cured urethane foam from leaking and expanding from a gap of a closed sectional structure due to an increased viscosity. If the amount of the amino and/or imino groups exceeds 3% by weight, the mixing of the two-pack urethane foam composition may become insufficient. It is also noted herein that the use of the amine compound having a number-average molecular weight of less than 110 may not achieve the effect of preventing a leakage of the cured urethane foam from a gap of the closed sectional structure.

For the two-pack urethane foam compositions for the present invention, there may be used a catalyst which may be usually used for a so-called urethane reaction. A such catalyst may include, for example, an amine-type catalyst such as, e.g., triethylene diamine, pentamethylene diethyl tetramine, N-ethylmorpholine, diethylethanol amine, 1,8-diaza bicyclo (5.4.0)undecene-7, etc., or a metallic-type catalyst such as, e.g., stannous octylate, dibutyl tin dilaurate, lead octylate, etc. The amount of the catalyst to be used may appropriately range usually from 0.0001% to 5% with respect to the total amount of the composition.

Moreover, as needed, the two-pack urethane foam composition may contain a conventional additive component such as a foam stabilizer, coloring agent (dye or pigment), plasticizer, filler, fire retardant, antioxidant, and so on in an appropriate amount.

(Cured Urethane Foam-Injected Vehicle Body Member and Injecting Method for Filling Cured Urethane Foam)

The present inventors have extensively studied to prevent an occurrence of the problems due to the lack of the filling volume, to provide a vehicle body member having a closed sectional structure reinforced by appropriately injecting and filling a cured urethane foam, and to provide an injecting method for injecting and filling the cured urethane foam. As a result of extensive studies, it has been found that the desired object can be achieved by locating a cured urethane foam-filling confirming opening of a particular dimension in a particular position, of the vehicle body member, for confirming the appropriateness of the filling volume of the cured urethane foam so as to adapt to the volume of the inside of the closed sectional structure. The present invention has been completed on the basis of this finding.

More specifically, the present invention provides a cured urethane foam-filled vehicle body member with the cured urethane foam injected and filled therein by injecting the two-pack urethane foam composition into the closed structure of the vehicle body member having a closed sectional structure, and foaming and curing the cured urethane foam composition injected and filled therein, which is characterized in that the cured urethane foam-filling confirming opening is of an opening size of 10 mm or smaller and is disposed by at most 50 mm from the location at which the cured urethane foam eventually reaches.

Further, the present invention provides an injecting method for injecting the cured urethane foam by injecting the two-pack urethane foam composition into the closed sectional portion of the vehicle body member having the closed sectional structure, and foaming and curing the two-pack urethane foam composition injected and filled therein, which is characterized in that the appropriateness of the filling volume of the cured urethane foam, in order to adapt to the volume of the inside of the closed sectional structure of the vehicle body member, is confirmed by locating a cured urethane foam-filling confirming opening having a dimension of at most 10 mm at a position that is at most 50 mm from the location that the cured urethane foam eventually reaches.

As the vehicle body member with a closed sectional structure according to the present invention, there may be mentioned a structural member, as shown in FIG. 7, such as composed of a connecting member having a front roof 1b (consisting of a roof rail inner and a roof rail outer), a front side roof rail 2b (consisting of a front side outer panel and a side roof rail inner), and a front pillar 3c (consisting of a front side outer panel and a front pillar inner) connected together at their one ends, in which shut-off plates 4b and 5b are disposed inside the front side roof rail 2b and the front pillar 3c, respectively, and the front side roof rail 2b is provided with an injection port 6b.

As another example, there may be illustrated a structural member as shown in FIG. 8, which is composed of a connecting member having a center pillar 7a (consisting of a center pillar inner and a center pillar outer) and a side roof rail 8a (consisting of a side roof rail inner and a side roof rail outer) connected together, in which the center pillar 7a is provided with a shut-off plate 9, the side roof rail 8a is provided with shut-off plates 10a and 11b, and the center pillar 7a is further provided with an injection port 12a.

(Cured Urethane Foam-Filling Confirming Method)

The present inventors have made extensive review and studies on various processes and ways of preventing the problems to be caused due to the lack of achieving the filling volume and reinforcing the vehicle body member by appropriately injecting and filling a cured urethane foam therein. As a result, the present inventors came to focus on the fact that heat can be produced together with foaming due to the reaction upon injecting the two-pack urethane foam composition in the closed sectional portion of the vehicle body member having a closed sectional structure, and that the heat produced can elevate the temperature of a panel located at the site of the vehicle body member where the composition was injected and filled in. More specifically, it has been found that a site where the urethane foam is filled in the vehicle body member, and a site where it is not filled in the vehicle body member can be distinguished from each other on the basis of a temperature difference between these two locations. The temperature difference is determined by measuring the temperature in a non-contact way at locations on the side surface of the vehicle body member in the vicinity of the location that the cured urethane foam reaches. Therefore, it can be confirmed whether the filling volume is appropriate as to adapt to the volume of the interior of the closed sectional structure by distinguishing the filled site from the non-filled site. The present invention in another aspect has now been completed on the basis of this finding.

In other words, the present invention provides a cured urethane foam-filling confirming method for confirming the injecting or filling of a cured urethane foam which is characterized in that, upon injecting and filling the two-pack urethane foam composition in the closed sectional portion of the vehicle body member having a closed sectional structure, and allowing the composition to foam and cure, the temperature is measured in a non-contact way from the outside at locations on the side surface of a vehicle body to determine a time difference between a filled site where the urethane foam is injected and filled in the vehicle body member and a non-filled site where it is not injected and filled in the vehicle body member, in order to confirm the appropriateness of a filling volume, as to whether the filling volume adapts to the volume of the interior of a closed sectional structure of the vehicle body member. The appropriateness or inappropriateness of the filling volume is confirmed on the basis of the temperature difference between the filled site and the non-filled site.

The vehicle body member having such a closed sectional structure according to the present invention may include, for example, a structural member, as shown in FIG. 9, composed of a connecting member having a front roof 1c (consisting of a roof rail inner and a roof rail outer), a front side roof rail 2c (consisting of a front side outer panel and a side roof rail inner) and a front pillar 3d (consisting of a front side outer panel and a front pillar inner) connected to one another. The front side roof rail 2c is provided with a shut-off plate 4c in the interior thereof, the front pillar 3d is provided with a shut-off plate 5c in the interior thereof, and the front side roof rail 2c is provided with an injection port 6c.

(Injection Process for Injecting Two-Pack Urethane Foam Composition)

The present inventors further have made extensive studies in order to solve the second problem referred to above and, as a result, have found that the two-pack urethane foam composition can be injected in a smooth fashion while achieving the desired purposes, by using as an injection apparatus a two-pack mix, high pressure foaming machine of a type mixing the two-pack urethane foam composition and jetting the composition under high pressure in a counter flow, and by setting a cream time to 3 seconds or less and a rise time to 10 to 120 seconds after the injection. In other words, the use of such an injection apparatus and the setting of the cream time and the rise time to such ranges can prevent the cured urethane foam from leaking outside from gaps and at the same time thoroughly avoid an occurrence of clogging during injection. The present invention, in a further aspect has been completed on the basis of this finding. It is to be noted herein that the term "cream time" referred to in this description is intended to mean a period of time from the start of the composition increasing its viscosity to the start time at which a gel strength can be recognized, and that the term "rise time" referred to therein is intended to mean a period of time from the time of injection of the composition to the time of suspending the foaming.

More specifically, the present invention provides an injection process for injecting a two-pack urethane foam composition, in which, upon injecting the two-pack urethane foam composition in the closed sectional portion of the vehicle body member with a closed sectional structure, a cured urethane foam is produced therein by allowing the composition to foam and cure. The two-pack urethane foam composition is injected with the two-pack mix, high pressure foaming machine of a type mixing the composition and jetting it under high pressure under conditions where the cream time is set to as short as 5 minutes or shorter and the rise time is set to 10-120 seconds from the start of injection.

(Injecting Apparatus and Injecting Method for Filling in Closed Sectional Structure of a Vehicle Body)

An injecting apparatus according to the present invention may comprise a manipulator movable to a desired position, a jet injector fixed to the manipulator, a supply device for supplying the foaming material to the injector, and a controller adapted to control the position of the manipulator so that the injector is aligned at the position in which the foaming material can be injected into the closed sectional structure of the vehicle body through an injection port of the same closed sectional structure thereof. The supply device can be controlled so that the foaming material can be injected and filled in the closed sectional structure thereof by only such an amount that is set so as to comply with the volume of the interior of the same sectional structure thereof. This construction of the injecting apparatus can inject and fill the foaming material into the closed sectional structure of each part of the vehicle body so as to adapt to a flow of a line on which a large number of vehicle bodies are conveyed in sequence. It is to be noted herein that the foaming material may include, for example, a two-pack urethane foam composition.

In accordance with the present invention, the injecting apparatus may be provided with a position detecting sensor for sensing an amount of deviation between the injector mounted on the manipulator and the injection port of the closed sectional structure of the vehicle body in such a manner that the amount of deviation is outputted from the position detecting sensor to the controller and the position of the manipulator is adjusted by the controller so that the amount of deviation becomes zero. Therefore, even if the vehicle body would deviate from the original position, the injecting nozzle can be aligned with each injection port of the closed sectional structure of the vehicle body in an accurate way.

Moreover, the present invention may further be provided with a monitor for monitoring the foamed and cured states of the foaming material in the interior of the closed sectional structure of the vehicle body, so that the monitor can single out a vehicle body with a non-filled portion where no foaming material is injected and filled in the closed sectional structure thereof, and determine and treat such a vehicle body as a defective product.

Furthermore, in accordance with the present invention, in cases where the monitor inspects the non-filled portion of the closed sectional structure of the vehicle body, where no foaming material is injected and filled therein, a reference image of the injection port can be corrected in accordance with the position of the non-filled portion in the interior of the closed sectional structure of the vehicle body, where no foaming material is injected and filled.

It is now to be noted herein that the two-pack urethane foam composition, as an object of the invention in aspects of a series of the invention, except for the two-pack urethane foam composition for urethane foam, that is, the injection method for injecting the two-pack urethane foam composition, the cured urethane foam-filled vehicle body member, the cured urethane foam-filling confirming method, the injection process for injecting the two-pack urethane foam composition, the injecting apparatus for injecting and filling in the closed sectional structure of the vehicle body, and the injecting method therefor, is not limited to a particular kind of the composition and may contain any optional composition that can be allowed to foam and cure at ambient temperature. Specifically, the two-pack urethane foam composition may include, for example, a two-pack composition consisting of the polyol compound as a major component, preferably, such as a polyether polyol obtainable by the addition reaction of the active hydrogen-containing compound, e.g., the polyvalent alcohol, bisphenols, amines, etc., with the alkylene oxide, preferably, such as the aromatic polyisocyanate, aliphatic or alicyclic polyisocyanate, aromatic aliphatic polyisocyanate, a modified product thereof, terminal NCO-containing urethane prepolymer obtainable by the reaction between the polyols and an excessive amount of such polyisocyanate compounds, etc. Further, for the two-pack urethane foam composition, the major component may be formulated with a foaming agent such as, for example, water, the chemical foaming agent of a thermally decomposable type (e.g., azodicarbodiamide, p,p'-oxy bisbenzene sulfonyl hydrazide, etc.) or the inorganical foaming agent of a thermally decomposable type (e.g., sodium hydrogen carbonate, etc.) and, as needed, a reaction catalyst, foam stabilizer, coloring agent, plasticizer, filler, fire retardant, antioxidant, and so on. Particularly, it is preferred to formulate the two-pack urethane foam composition with such an additive so that the resulting cured material becomes hard. It is further to be noted that, for the invention relating to the injection process for injecting the two-pack urethane foam composition, it is preferred to adjust the two-pack urethane foam composition injected from the two-pack mix, high pressure foaming machine so as to set the cream time to 5 seconds or shorter and the rise time to 10-120 seconds.

Although the above aspects of the invention can achieve the corresponding effects as sought to be achieved by applying it singly, the combination of two or more of the above aspects of the invention as described above can achieve further favorable effects when taken in account from the viewpoint of the reinforcement of the rigidity of the closed sectional structure of the vehicle body and performance of soundproof properties.

For instance, when the invention relating to the two-pack urethane foam composition for urethane foam is combined with another of the aspects of the invention, the further effect of preventing the leakage of the injected two-pack urethane foam composition toward outside can be achieved, in addition to those effects as sought to be achieved by each of the above aspects. In particular, it can be noted herein that the present invention is designed so as to cause the two-pack urethane foam composition to fail to leak outside and expand from the closed sectional structure, so that the application of the aspect relating to the such two-pack urethane foam composition to each of the aspects relating to the injection method and the injection process for injecting the two-pack urethane foam composition can add the effects as sought to be achieved by each of the aspects for the injection method and process to the effects as achieved by the invention for the composition itself.

Moreover, upon reinforcing the closed sectional structure of the body of a vehicle such as an automobile, etc. by filling the cured urethane foam therein, the aspect relating to the two-pack urethane foam composition can be applied so as to confirm the injecting and filling of the cured urethane foam by the aspect relating to the cured urethane foam-filling confirming method by injecting the two-pack urethane foam composition in accordance with the aspect relating to the injection process for injecting the two-pack urethane foam composition while injecting and filling the composition in the interior of the closed sectional structure of the vehicle body automatically with the manipulator by using the aspect relating to the injecting apparatus for injecting and filling the urethane foam in the closed sectional structure. This configuration can inject and fill the closed sectional structure with an appropriate amount of the two-pack urethane foam composition without leaking the composition from the closed sectional structure, thereby reinforcing the closed sectional structure of the vehicle body and producing vehicles with their closed sectional structures reinforced therewith on a mass scale.

The features and effects to be achieved by the aspects of the invention as described above will become apparent to those skilled in the art in the course of the description which follows, with reference to the accompanying drawings and the appended claims.

Before turning to a detailed description of each embodiment of the aspects of the invention as described above, it is to be understood that each of the aspects is not limited to the application of a detailed disposition and construction of structuring elements as indicated in the accompanying drawings referred to in the following description. It is further to be understood that the aspects of the invention as described above can encompass other embodiments within the scope thereof and be performed and practiced by various processes and, in addition, that the terms and expressions as referred to herein are used singly for illustrative purposes and they should not be interpreted to limited meanings in any respect, unless otherwise stated herein and interpreted in that context.

BRIEF DESCRIPTION OF THE DRAWINGS

The present invention will be better understood with reference to the embodiments which will be described in more detail hereinafter and to the accompanying drawings. In the accompanying drawings:

FIG. 1 is a schematic view showing the state in which a shut-off plate for an injection port is mounted on the inside of a structural member to be injected and filled, for use in the injection method for injecting the two-pack urethane foam composition according to the present invention.

FIG. 2 is a view showing an example of a rubber-formed member with a cross cut portion, which is to open and close the injection port; wherein (A) is a plan view and (B) is a front view.

Figure 3:
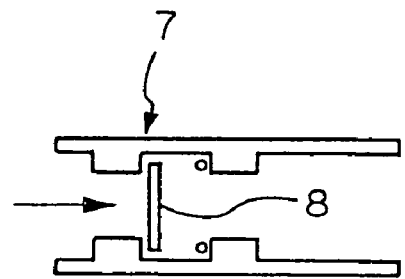
FIG. 3 is a schematic view showing an example of a check valve.

DESCRIPTION OF THE PREFERRED EMBODIMENTS (Injection Method for Injecting Two-Pack Urethane Foam Composition)

A detailed description will be made of embodiments of the invention relating to the injection method for injecting a two-pack urethane foam composition (hereinafter referred to as a "foaming material" or an "expandable material") with reference to the accompanying drawings. The injection method according to the present invention has the object of preventing the leakage of the injected composition due to a back flow upon injecting the foaming material, and is characterized in that the objects can be achieved by making modifications as shown in FIGS. 1 to 3, inclusive:

(i) As shown in FIG. 1, a shut-off plate 3 for an injection port 2 is mounted with, e.g., a hinge 4 on the inner side of a structural member 1 to be injected and filled. With this configuration, a discharging and injecting nozzle of a mixing head (not shown) is inserted through the injection port 2 or brought into contact therewith. As the foaming material is then injected into the inside of the structural member 1 through the injection port 2 in this state, the shut-off plate 3 is caused to be raised upwardly as indicated by the arrow in FIG. 1. On finishing the injection and suspending the applying of the foaming material or injecting from the discharging nozzle of the mixing head into the injection port 2, the shut-off plate 3 is allowed to drop down and close the injection port 2, thereby preventing the injected foaming material from back flow after foaming and curing.

(ii) As shown in FIGS. 2(A) (a plan view) and 2(B) (a front view), a rubber-formed member 6 is provided with a cut portion 5 (e.g., an X-shaped cross cut, etc.) which can be opened or closed and through which the foaming material can be injected and filled therein. The rubber-formed member 6 is disposed on the structural member 1 such that the cut portion 5 is fixed into the injection port 2. With this configuration, the discharging nozzle of the mixing head is inserted into or through the cut portion 5 of the rubber-formed member 6 or brought into contact therewith, and the foaming material can then be injected into the structural member 1. As the cut portion can be attached so tight to the discharging nozzle of the mixing head, and the boundary between the discharging nozzle thereof and the cut portion can be kept in an airtight state due to elasticity of the rubber material, the leakage of the foaming material injected therein from the inside of the structural member due to a back flow can be prevented thoroughly.

(iii) As a further modification, as shown in FIG. 3, a check valve 7 is mounted on the injection port 2, the check valve 7 being designed so as to allow a fluid to pass in one direction only. With this configuration, a valve 8 of the check valve 7 is caused to move in the direction as indicated by the arrow in FIG. 3 and open a passage for the foaming material when the foaming material is injected from the discharging nozzle in the same direction. The valve 7 can return to its original position immediately after the suspending of the injecting of the foaming material, thereby completely preventing an occurrence of a back flow of the foaming material once injected therein.

Then, a description will be made of specific examples of the embodiment of the present invention.

Figure 4:
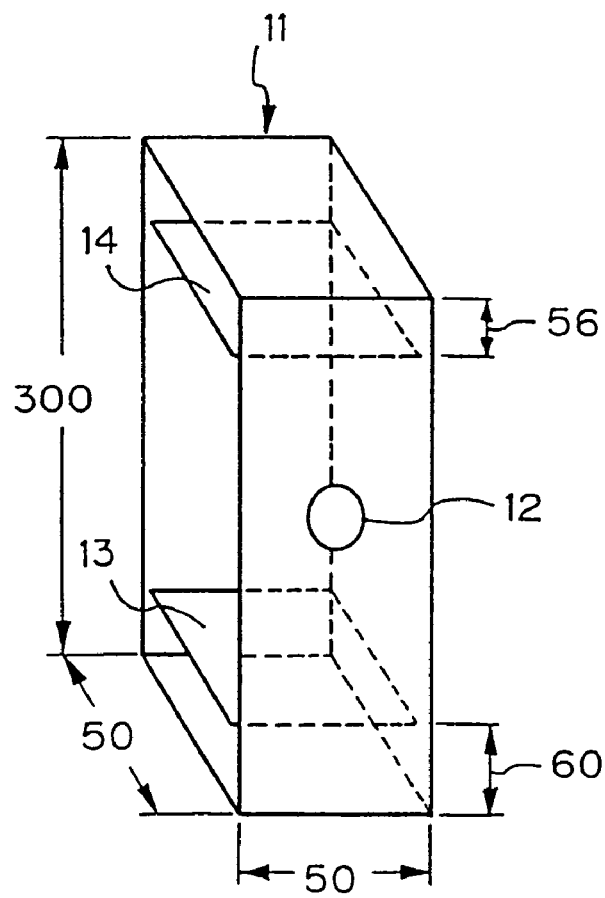
FIG. 4 is a perspective view showing a test box (i.e., a structural member to be injected and filled) for use in an example of the two-pack urethane foam composition.

As shown in FIG. 4, a test box 11 of a dimension of 50×50×300 mm was prepared, and an injection port 12 of a 20 mm diameter is provided in the front wall thereof. Inside the test box 11, a partition plate 13 of a 50×46 mm dimension and a partition plate 14 of a 50×46 mm dimension are mounted in the positions as indicated in the drawing. As a foaming material, there was used a two-pack urethane foam composition consisting of a major component (50 parts by weight of a polyether polyol: Product of Sanyo Kasei Kogyo K.K., Trade name: SANNIX™ TP-700; 0.1 part by weight of water; and 1 part by weight of a reaction catalyst) and a curing agent (50 parts by weight of crude MDI).

A rubber-formed member (an outer diameter: 20 mm; an inner diameter: 15 mm) with an X-shaped cross cut was inserted into the injection port 12. The resulting foaming material in the amount of 200 grams was then injected into the test box 11 through the injection port 12 from a discharging nozzle of a mixing head (Toho Kikai Kogyo K.K.; Model: SP-205; an opening size, 8 mmφ in an outlet diameter). As a result of test, the leakage of the cured urethane foam was recognized in the amount of as slightly small as 5 grams.

In contrast to this test, a similar test was carried out by using the same construction of the test box and the mixing head, etc., with the rubber-formed member excluded therefrom. As a result, it was found that the cured urethane foam was leaked outside in the amount as large as 26 grams.

(Two-Pack Urethane Foam Composition for Urethane Foam)

The following is a description of an embodiment relating to a mode of using the foaming material containing the above components for the invention relating to the two-pack urethane foam composition for urethane foam.

First, the polyol compounds of the major component (a) are formulated with a specific limited foaming agent only or with a mixture of a foaming agent, selected optionally from the limited foaming agent and the conventional foaming agent, with a specific amine compound, followed by adding a foam stabilizer, catalyst and any other additive component, as needed, and then mixing them.

Then, the resulting forming material was mixed rapidly and continuously with a polyisocyanate compound as the curing agent (b) at a constant rate, followed by foaming and allowing to cure immediately after injecting (applying) it into a given site. This process yielded a hard or soft urethane foam having a predetermined specific gravity. It is to be noted herein that the foaming rate of the foam may be generally set to approximately 1.5 to 4 times for use with reinforcement purposes.

For uses of the two-pack urethane foam composition according to the present invention, it is particularly useful for the application as a foaming material for use in injecting it mainly in a pillar having a closed sectional structure of the vehicle body of an automobile because no injected composition leaks outside and expands from gaps of injection ports upon injecting and foaming the two-pack urethane foam composition. In addition thereto, the two-pack urethane foam composition may be generally applied to a sufficient extent to an interior or exterior member (e.g., door lining, console box, instrument panel, air-conditioning spoiler, etc.) of a general-use automobile, furniture and housings for electrical devices, etc., interior part members, and so on.

The present invention will be described in more detail by way of specific examples.

EXAMPLES 1 TO 8

Two-pack urethane foam compositions were prepared in accordance with the procedures as described above by mixing major component (composed of polyol compounds, amine compounds (3,3'-dimethyl-4,4'-diaminodicyclohexyl methane), a foaming agent and a reaction catalyst (pentamethylene diethyl tetramine)) and crude MDI as the curing agent in amounts as indicated in Table 1 below. After mixing all the components, the forming material was immediately subjected to a test for the following performance as will be described below.

The test results are shown in Table 1 below.

Specific Gravity:
The specific gravity of the cured urethane foam was measured in accordance with JIS K7222.

Leaking Performance:
Using a two-pack mixing, high-pressure foaming machine (Gusmer; Model H-2000) and a mixing head (Gusmer; Model GX-7), the two-pack urethane foam compositions prepared in the above examples were injected in an injection frame 1a, as shown in FIG. 5, each in the amount so as to allow the volume of the cured urethane foam to amount to 2,600 cc, and there was confirmed the presence or absence of leaking the cured urethane foam from gaps 5a (supposed to be used for a flange), each of 1 mm, on both sides of the front surface of the injection frame 1a, and the presence or absence of sagging from a partition plate 6a (with a clearance of 2 mm).

In Table 1 below, symbol "O" shown in the row entitled "Leaking Performance" indicates no leaking of the cured urethane foam from the flange (i.e., gap of a 1 mm length) and no sagging thereof (in the length of 50 mm or longer) from the partition plate 6a (having a clearance of 2 mm). Symbol "x" shown in the row entitled "Leaking Performance" indicates leaking of the cured urethane foam from the flange (i.e., gap of a 1 mm length) and sagging thereof (in the length of 50 mm or longer) from the partition plate 6a (having a clearance of 2 mm).

Figure 5:
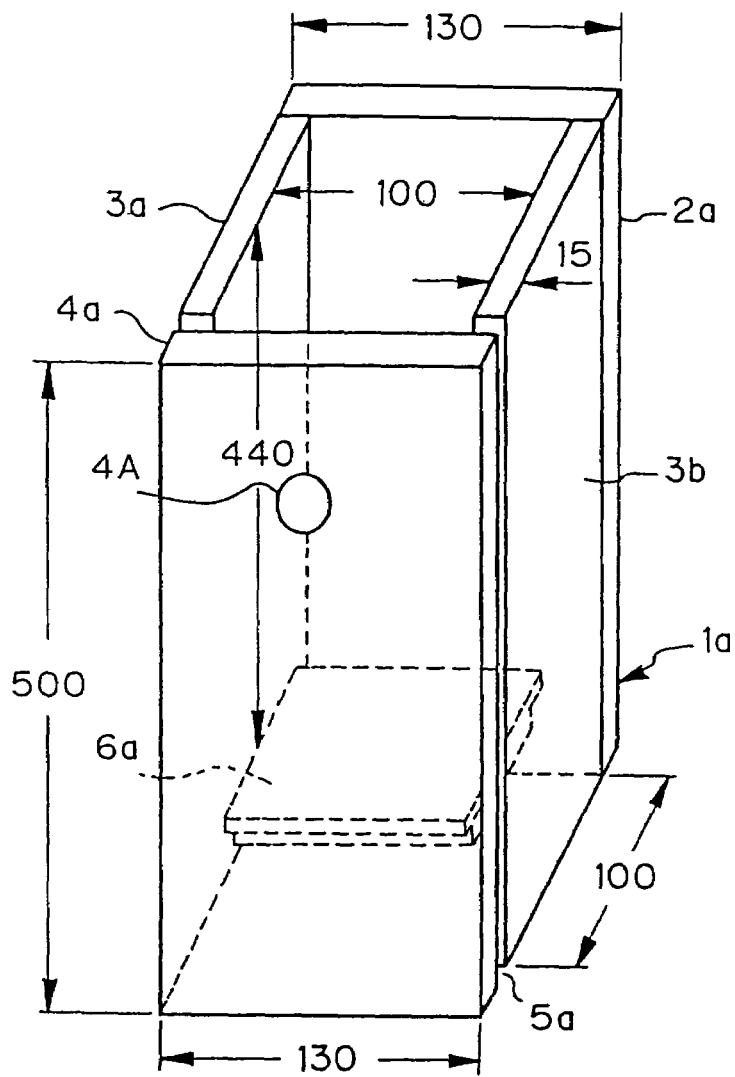
FIG. 5 is a perspective view showing an example of an injection frame for use in a leakage test of the two-pack urethane foam composition for urethane foam according to an embodiment of the present invention.
Figure 6:
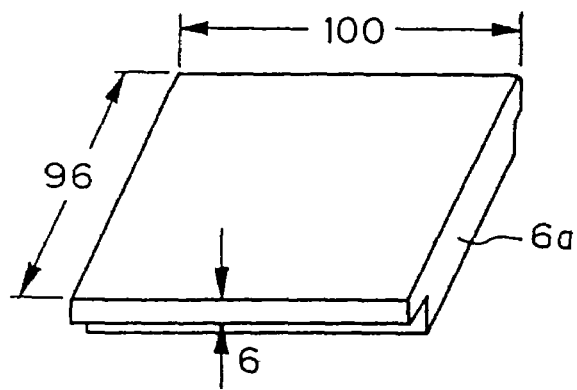
FIG. 6 is a perspective view showing a partition plate disposed in the injection frame of FIG. 5.

As shown in FIG. 5, the injection frame 1a was assembled with a rear frame plate 2a (130×500×15 mm), side frame plates 3a and 3b (100×500×15 mm), and a front frame plate 4a (130×500×15 mm) so as to provide a gap 5a of a 1 mm width on the front side. Further, the partition plate 6a as shown in FIG. 6 was fixed with its top surface located below by 440 mm from the top surface of the frame 1a and with its front end surface located having a clearance of 2 mm from the inner rear surface of the front wall.

Bending Performance:
The bending modulus (Mpa) was measured in accordance with JIS K7221 under the following conditions:
 Conditions
 As a shape, height: 10 mm; width: 10 mm; length: 150 mm
 Distance between support points: 100 mm
 Testing speed: 10 mm per minute Pressure wedge: 5 mm
Radius of support base: 2 mm

TABLE 1

| Polyols*1) Hydroxy Group Value | EXAMPLES | | | | | | | |
|---|---|---|---|---|---|---|---|---|
| | 1 | 2 | 3 | 4 | 5 | 6 | 7 | 8 |
| Polyol A(560) | 50 | — | 50 | 50 | 50 | 50 | 50 | 40 |
| Polyol B(240) | — | — | — | — | — | — | — | — |
| Polyol C(550) | — | 50 | — | — | — | — | — | 10 |
| Polyol D(450) | — | — | — | — | 20 | — | — | — |
| Amino compound*2) | 2 | 2 | 2 | 3 | 2 | 2 | — | — |
| Foaming agent*3) | | | | | | | | |
| Water | 0.1 | 0.1 | — | — | 0.1 | 0.2 | — | — |
| ADCA | — | — | 2 | — | — | — | 2 | — |
| OBSH | — | — | — | 2 | — | — | — | 2 |
| Reaction catalyst | 1 | 1 | 1 | 1 | 1 | 1 | 1 | 1 |
| Curing agent | 50 | 50 | 50 | 50 | 50 | 50 | 50 | 50 |
| Specific Gravity | 0.4 | 0.4 | 0.4 | 0.4 | 0.4 | 0.3 | 0.4 | 0.4 |
| Leaking Performance | ◯ | ◯ | ◯ | ◯ | ◯ | ◯ | X | X |
| Bending Modulus (Mpa) | 280 | 375 | 300 | 295 | 290 | 190 | 300 | 290 |

In table 1:
*1)Polyol A: Polyether triol (trimethylol propane base) of Sannyo Kasei Kogyo K.K.; Trade name "SANNIX ™ TE-300"
Polyol B: Polyether triol (trimethylol propane base) of Sannyo Kasei Kogyo K.K.; Trade name "SANNIX ™ TP-700"
Polyol C: Polyether triol (toluene diamine base) of Sannyo Kasei Kogyo K.K.; Trade name "SANNIX ™ HA-501"
Polyol D: Glycerin base terminal isobutylene oxide adduct (polyether triol)
*2)The amount of the amino group or imino group of the amine compound (in this example, —$NH_2$ group only) to the total amount of the polyol compound and the curing agent can be calculated by the formula (e.g., in Example 1) as follows: $NH_2$ group value = (2 × 32/238)/(50 + 50) × 100 = ca. 0.27%
*3)ADCA: Azodicarbodiamide
OBSH: p, p'-Oxy bisbenzene sulfonyl hydrazide From the results of Table 1, it is recognized that the two-pack urethane foam composition can be injected at the objective location without causing leaking and the hard urethane foam having an excellent mechanical strength can be formed by adding the appropriate amounts of the particular amine compound and the foaming agent to the major component (in Examples 1-6). Further, in Examples 7 and 8, it can be confirmed that the urethane foam having a specific gravity in the appropriate scope can be formed.

(Cured Urethane Foam-Filled Vehicle Body Member and Injected Method for Filling Cured Urethane Foam)

Figure 7:
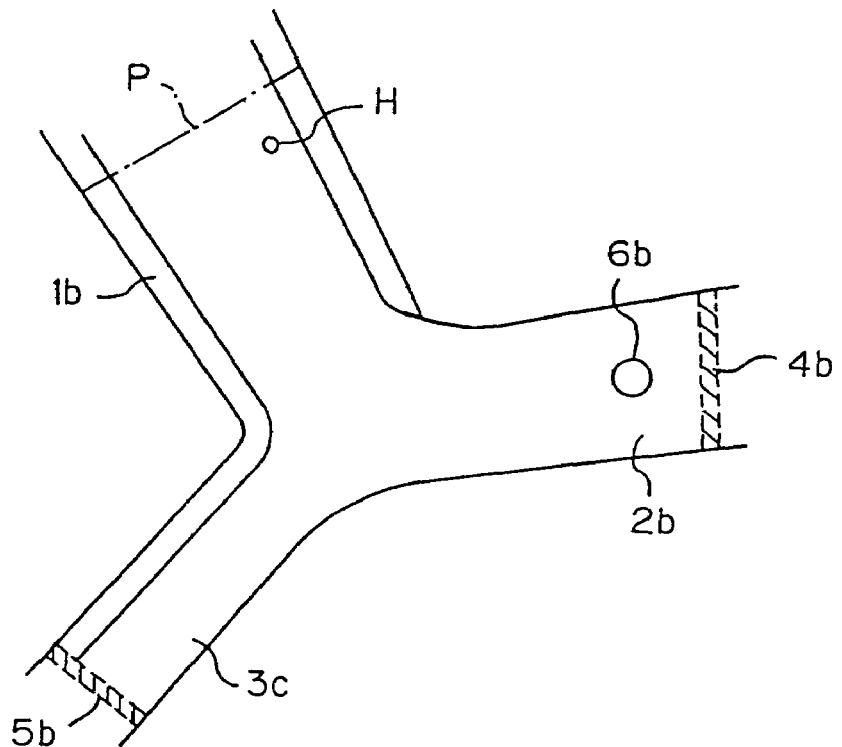
FIG. 7 is a schematic view showing an example of a vehicle body member having a closed sectional structure in connection with a cured urethane foam-filled vehicle body member according to the embodiment of the present invention.
Figure 8:
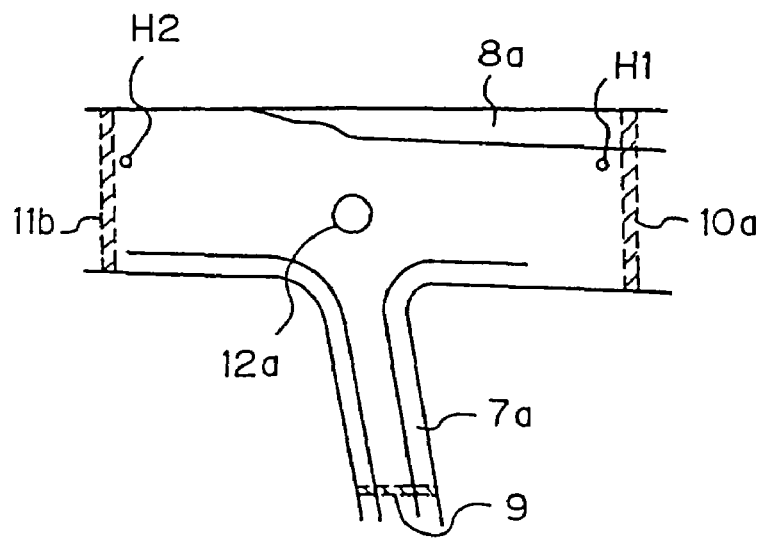
FIG. 8 is a schematic view showing another example of the vehicle body member having the closed sectional structure in connection with the cured urethane foam-filled vehicle body member according to the embodiment of the present invention.

The examples concerning the invention relating to the cured urethane foam-filled vehicle body member and to the injected method for injecting and filling the cured urethane foam are characterized in that one or two or more cured urethane foam-filled confirming openings is or are disposed at given locations of the structural member as shown in FIGS. 7 and 8. For instance, as shown in FIG. 7, when the two-pack urethane foam composition is injected from the injection port 6b, it is first allowed to move toward the front pillar 3c and then expand toward the front side roof rail 2b. During this period of time, the composition also moves around the top end portion and the corner portion and then advances upwardly above the front roof 1b, eventually reaching the limit position P as shown in the drawing.

Therefore, it can be visually confirmed whether the filling volume of the cured urethane foam to be formed is running short or not by locating the cured urethane foam-filling confirming opening H in the position by 50 mm or less, preferably 1-30 mm, on this side of the limit position P. With this configuration, when the opening H is generally seen from yellow to yellow brown in color, it means that the cured urethane foam is extending through the location. If no foam is located therein, the opening H is seen dark black as it is in an empty state.

If the position of the cured urethane foam-filling confirming opening H is situated by more than 50 mm beyond the limit position P, it becomes difficult to judge an accurate status of the filling volume as to whether it is appropriate or not even if the presence of the cured urethane foam has been confirmed at the position of the opening H.

Further, the opening size of the cured urethane foam-filling confirming opening H may be set to 10 mm or smaller, preferably from 1 to 7.5 mm. If the opening size is larger than 10 mm, the cured urethane foam may leak and expand from the opening, and it is not desired from the point of view that the resulting urethane foam may not increase rigidity of the vehicle body.

From the same point of view as the cured urethane foam-filling confirming opening H is disposed, the structural member as shown in FIG. 8 may be provided with two urethane foam-filling confirming openings H1 and H2.

By locating the cured urethane foam-filling confirming opening or openings in the manner as described above, it is possible to confirm with the eye whether the filling volume of the cured urethane foam is appropriate or not and at the same time to assure the intensity and rigidity as guaranteed on a design. Further, it can be avoided in advance to produce vehicles in a large number, which can be predicted to become short of the filling volume of the cured urethane foam. Moreover, when it is found with the eye that the filled amount of the urethane foam is lacking, it is also possible to determine a rough amount of the lack of the cured urethane foam therein by inserting a wire or the like through the cured urethane foam-filling confirming opening and then to inject an additional amount of the foaming material through an injection port which may be disposed separately.

Then, the present invention will be described in a more specific fashion by way of examples.

Structural Member as Shown in FIG. 7:
Inner volume: 1,250 cc.
Urethane foam-filling confirming opening H: situated by 30 mm on this side from the limit position P; opening size, 3 mm.
Injection port 6b: port size, 20 mm.

The two-pack urethane foam composition (density after foaming: 350 kg/m³) was injected in the total amount of 438 grams at the rate of 5 kg per minute through the injection port 6b by use of a two-pack mixing foaming machine. In this case, the location of the cured urethane foam was confirmed with the eye through the cured urethane foam-filling confirming opening H disposed in the front roof 1b. Further, it was recognized that no urethane foam was leaked and expanded whatsoever from the opening H.

Structural Member as Shown in FIG. 8:
Inner volume: 1,300 cc.
Urethane foam-filling confirming openings H1, H2: situated by 30 mm from the upper side edge (limit position of the side roof rail 8a); each opening size, 5 mm.
Injection port 12b: port size, 20 mm.

The two-pack urethane foam composition (density after foaming: 350 kg/m³) was injected in the total amount of 455 grams at the rate of 5 kg per minute through the injection port 12a by use of a two-pack mixing foaming machine. In this case, the location of the cured urethane foam was confirmed with the eye through the cured urethane foam-filling confirming openings H1 and H2 disposed in the side roof rail 8a. Further, it was recognized that no urethane foam was leaked and expanded whatsoever from the cured urethane foam-filling confirming openings H1 and H2.

The present invention having the above configuration can confirm with the eye whether the cured urethane foam is injected and filled over the entire predetermined length of the closed sectional portion of the vehicle body member having a closed sectional structure and assure the intensity and rigidity as guaranteed on a design and designed on the basis of the application of such cured urethane foam, by locating the cured urethane foam-filling confirming opening of a particular dimension in a position around a filled site to which the cured urethane foam eventually reaches after the injection and by foaming of the two-pack urethane foam composition in the vehicle body member having a closed sectional structure. Moreover, the present invention can serve as an effective measure for practically utilizing an injecting method for injecting and filling a cured urethane foam, which can meet social needs for making the weight of a vehicle body light and achieving improvements in intensity and rigidity of a vehicle body.

(Cured Urethane Foam-Filling Confirming Method)

Figure 9:
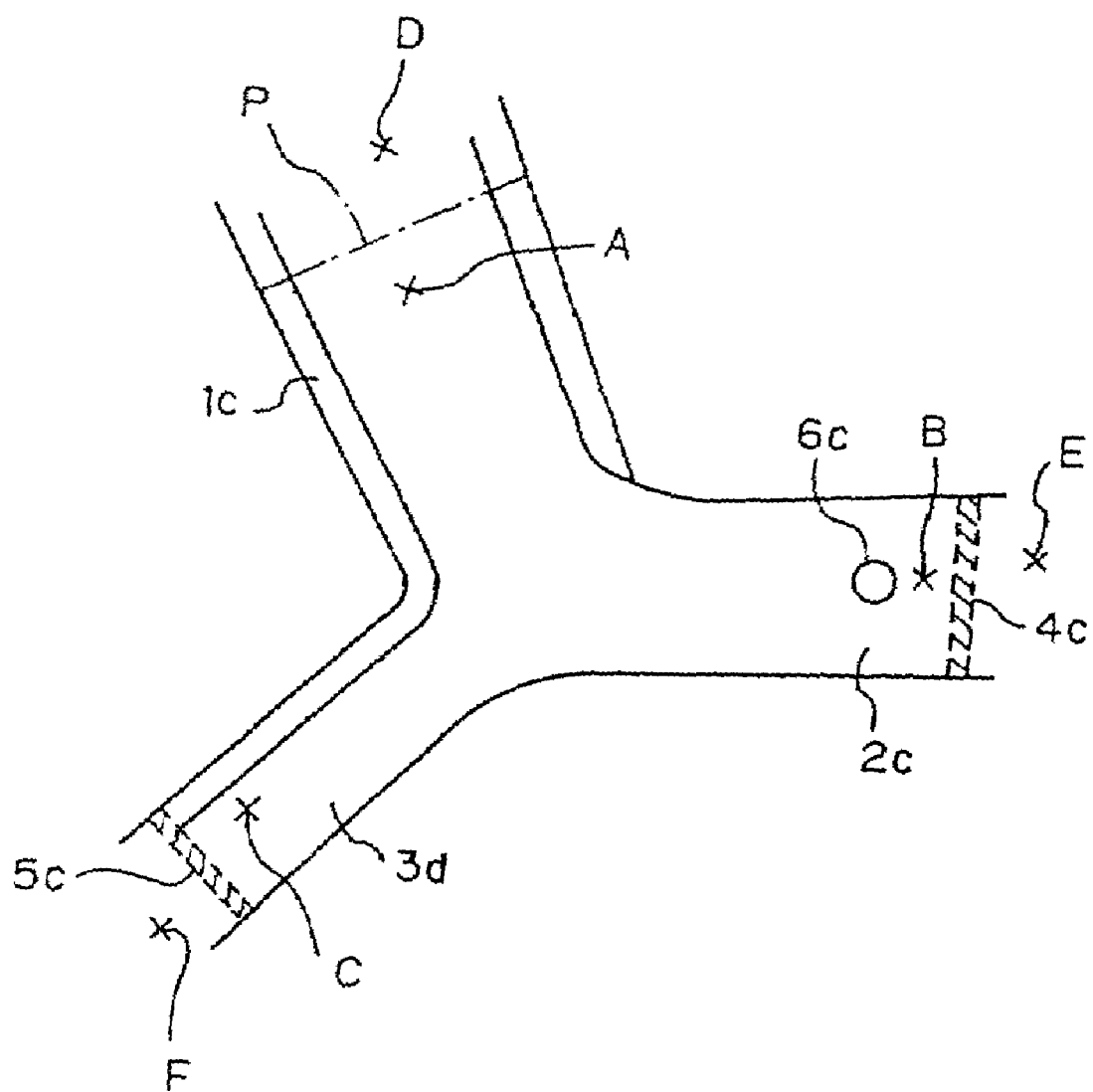
FIG. 9 is a schematic view showing a vehicle body member having a closed sectional structure for use with the cured urethane foam-filling confirming method according to the embodiment of the present invention.

The examples of the invention relating to the cured urethane foam-filling confirming method are intended to illustrate a way of determining a temperature difference between a filled site and a non-filled site by measuring in a non-contact way the temperature at locations on the side surface of the vehicle body member as shown in FIG. 9. For instance, as shown in FIG. 9, when the two-pack urethane foam composition as a foaming material is injected from the injection port 6c, the foaming material first travels toward the front pillar 3d while being allowed to foam and cure (and at the same time producing heat) and then expands toward the front side roof rail 2c, eventually expanding upwardly above the front roof 1c around the upper end portion and the corner portion thereof and reaching the limit position P as indicated in FIG. 9. It is to be noted herein that the panel temperature at the packed location of the vehicle body member rises as the temperature (generally about 170° C.) elevates due to heat produced by the reaction of the two-pack urethane foam composition. Although a rate at which the temperature rises may vary with a panel thickness or a double structure of the panel, the rise of the temperature in the panel can be confirmed as aging by setting up a standard from 1 to 5 minutes (if the panel thickness is thicker than required, a standard may be set up from about 2 to 5 minutes). And it is confirmed that the temperature generally reaches 50° C. to 100° C. at the urethane foam-filled site (on the other hand, the temperature rise at the non-filled site may usually be somewhat lower than the ambient temperature, i.e., 40° C. or less). Therefore, the filled site and the non-filled site of the vehicle body member can be distinguished from each other on the basis of the temperature difference (usually 10° C. or higher, preferably 20° C. or higher) by measuring in a non-contact way the panel temperature at the locations on the side surface of the to-be-filled closed sectional structure within a predetermined period of time after the foaming and curing of the two-pack urethane foam composition. Then, the appropriateness or inappropriateness of the filling volume of the urethane foam can be confirmed on the basis of the distinction of the filled site from the non-filled site. Moreover, at the same time, the intensity and rigidity of the vehicle body member can be assured as guaranteed on the design, thereby avoiding in advance the production of vehicles which can be predicted so as to have a portion short of the required filling volume.

In addition, once such a portion short of the required filling volume would be detected, the lack of the required filling volume can be compensated for by injecting an additional amount of the two-pack urethane foam composition through an injection port which in turn may be disposed separately around the non-filled site of the vehicle body member.

In accordance with the present invention, the non-contact temperature measurement may be carried out by any conventional device which can sense infrared rays emitting naturally from an object and make a multi-point display of the temperature on a surface of the object in a non-contact way or can provide a temperature distribution as thermal image data. Such a device is generally referred to as infrared thermal image device or infrared radiation thermometer.

Furthermore, the system according to the present invention may be installed with a device having the functions of generating a signal indicating the appropriateness of the filling volume and giving information that the filling volume is appropriate, when the temperature of an object for measurement is located inside a predetermined monitor temperature scope by measuring the temperature at sites of the object, detecting a packed site and a non-packed site thereof, and determining a temperature difference between the packed and non-packed sites. On the other hand, when the temperature of the object for measurement is located outside the predetermined monitor temperature scope, i.e., when a temperature difference between the filled site and the non-filled site of the object does not amount to 10° C. or higher, a device may further be installed which can produce an alarm signal such that the filling volume is not appropriate.

Specific details of the example will be described hereinafter.

A two-pack urethane foam composition (density after foaming: 350 kg/m$^3$) in the total amount of 438 grams was injected into a vehicle body member as shown in FIG. 9 (having the inner volume of 1,250 cc in a closed sectional structure) through an injection port 6c (having a port size of 20 mm) at the rate of 5 kg per minute with a two-pack mixing high-pressure foaming machine. When 2 minutes elapsed after foaming and curing, the panel temperature was measured at sites (points A to F) as shown in FIG. 9 with an infrared thermal image device (Nippon Abionix K.K.; Model: TVS-110). The panel temperature at the sites was as follows: point A, 58° C.; point B, 54° C.; point C, 63° C.; point D, 22° C.; and point E, 25° C.

In addition, an overall distribution of the panel temperature including the points A-F was observed by the same measurement device.

It was further confirmed that no buzzer was sounded as a result of measurement by the same measurement device installed additionally with an alarm unit that can issue an alarm signal and sound a buzzer when the temperature difference between every two points (points A and D; points B and E; and points C and F) does not reach 10° C. or smaller.

With the above configuration, the present invention can confirm whether the cured urethane foam is injected and filled over the entire predetermined length of the closed sectional portion of a vehicle body member having a closed sectional structure and assure the intensity and rigidity as guaranteed on a design and designed on the basis of the application of such cured urethane foam, by measuring the panel temperature in a non-contact way within a predetermined period of time after the injection and foaming of the two-pack urethane foam composition in the vehicle body member. Moreover, the present invention can serve as an effective manner for practically utilizing a method for injecting and filling a cured urethane foam, which can meet social needs for making the weight of a vehicle body light and achieving improvements in intensity and rigidity of a vehicle body.

(Injection Process for Injecting Two-Pack Urethane Foam Composition)

Figure 10:
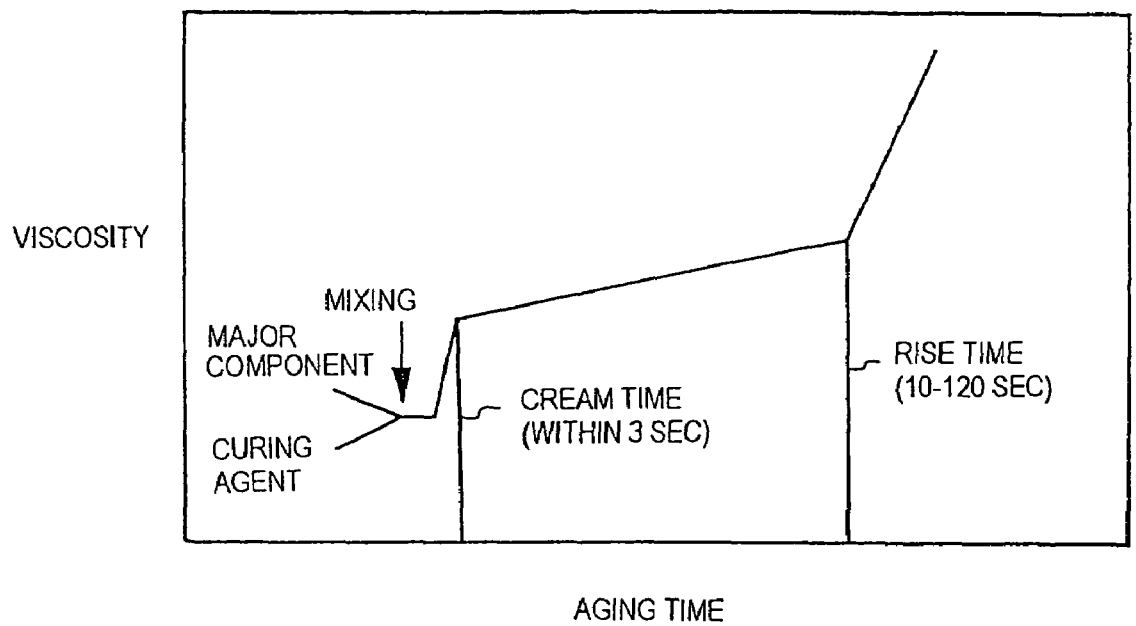
FIG. 10 is a graph showing an outline of changes (changes in viscosity as an elapse of time) of states in which the two-pack urethane foam composition was mixed and discharged in the injection process for injecting the two-pack urethane foam composition according to the embodiment of the present invention and in which it has been discharged.

The examples of the invention relating to the injection process for injecting the two-pack urethane foam composition are characterized in that the two-pack urethane foam composition as an object is injected into a closed sectional structure of a vehicle body member (such as, e.g., a pillar section, a roof section, a side member section, a locker section, etc.) by use of a two-pack mixing high-pressure foaming machine for mixing with jetting out the two-pack composition in a counter flow under high pressure. The curing behavior injection changes the states of the two-pack urethane foam composition after mixing and discharging (injecting) as shown in FIG. 10. More specifically, when the major component is mixed with the curing agent, the resulting mixture may become viscous enough to cause neither sagging nor leaking and expanding in about 3 seconds or shorter after discharging (in other words, the cream time is within 3 seconds). Moreover, by setting the rise time to 10-120 seconds, preferably 15-60 seconds, the cured urethane foam can be injected and filled in every corner so as to satisfy the filling volume of the urethane foam therein, and no cured urethane foam leaks from any gap of the closed sectional structure.

As the two-pack mixing high-pressure foaming machine, there may preferably be used a machine installed with a compact and lightweight mixing head, and such a machine may include, for example, a two-pack mixing high-pressure foaming machine (Gusmer; Model: VH-3000) installed with a mixing head (Toho Kikai Kogyo K.K.; Model: NR-205).

Next, the present invention will be described in more detail by way of specific examples with reference to a comparative example.

EXAMPLES 1 & 2 AND COMPARATIVE EXAMPLE 1

Figure 11:
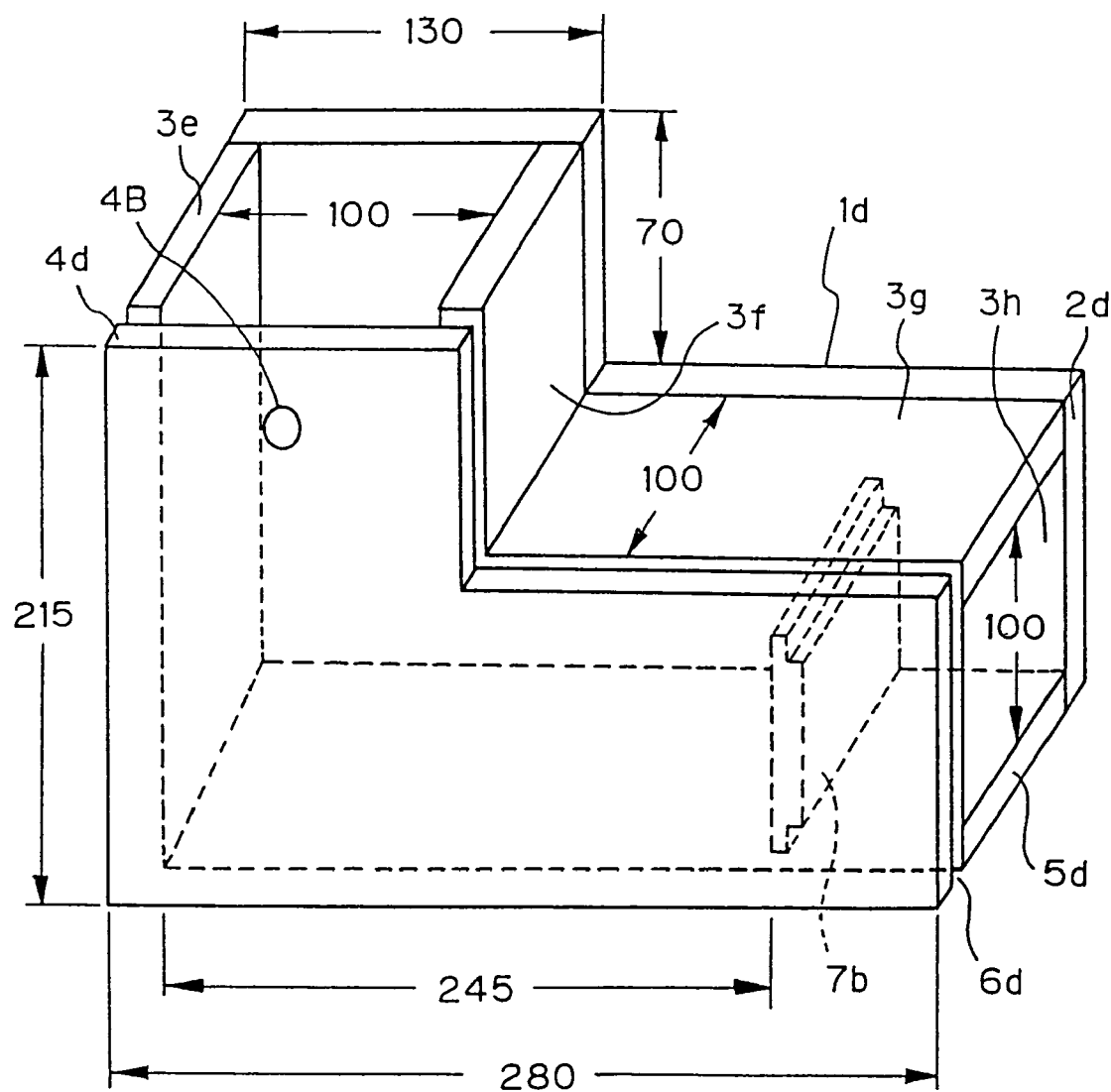
FIG. 11 is a perspective view showing an example of an injection frame for use with the injection process for injecting the two-pack urethane foam composition according to the embodiment of the present invention.

Using the major component (composed of polyol compounds, amine compounds (3,3'-dimethyl-4,4'-diaminodicyclohexyl methane), a foaming agent (water) and a reaction catalyst (pentamethylene diethyl tetramine)) and crude MDI as a curing agent in the amounts as indicated in Table 2 below, the resulting mixture was injected into an injection frame $1d$ (supposed to form a locker portion), as shown in FIG. 11, in accordance with the following procedures by use of the two-pack mixing high-pressure foaming machine VH-3000 installed with the mixing head NR-205 (Toho Kikai Kogyo K.K.). Table 2 below indicates the test results of performance test (packing performance and leakage or expanding), together with the cream time and rise time.

Figure 12:
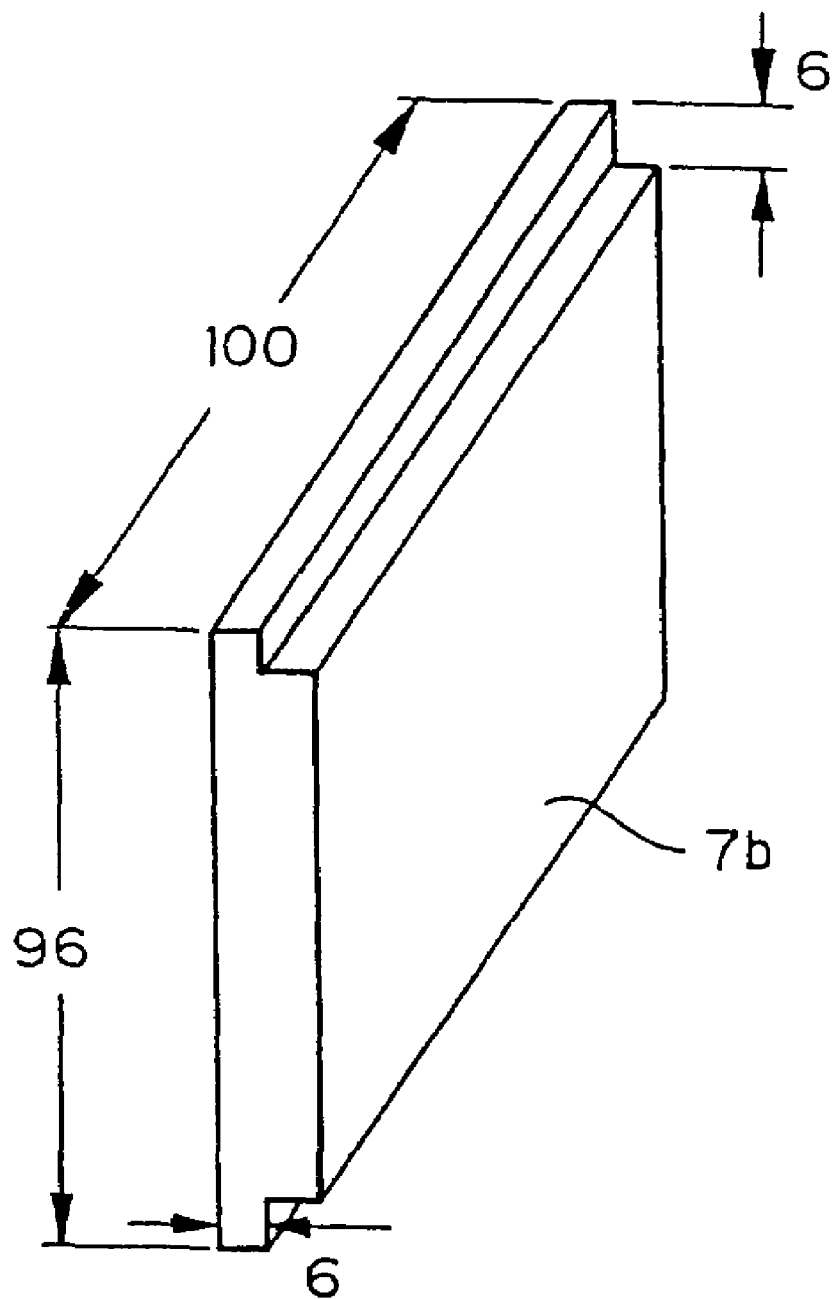
FIG. 12 is a perspective view showing a partition plate disposed in the partition frame of FIG. 11.

It is to be noted herein that the injection frame $1d$ comprises component panels (each having a thickness of 15 mm) having dimensions (in mm unit) as shown in FIG. 11, i.e., a rear frame plate $2d$, frame plates $3e$, $3f$, $3g$ and $3h$, a side frame plate $4d$ (having an injection port 4B of a 20 mm diameter disposed at its upper location), and a bottom plate $5d$, and that they are assembled together in the manner as indicated in FIG. 11 by locating a gap $6d$ of a 2 mm distance toward the rear from the side frame plate $4d$. Further, a partition plate $7b$ having the dimensions (in mm unit), as shown in FIG. 12, is fixed such that its side surface is located 245 mm from the left-hand, inner side surface of the frame $1d$ in such a manner that the clearance from the frame plate $3g$ and the bottom plate $5d$ is set to be 2 mm.

Procedures of Injection

The two-pack urethane foam composition component composed of the major component and the curing agent are supplied to a mixing head through hoses of a ⅜ inch size and a ¼ inch size, respectively, from a foaming material supply cylinder unit having its hydraulic pressure set to 50 kg per square meter while maintaining the temperature of each of the foaming materials at 40° C., in order to manage characteristics such as, for example, the viscosity of the foaming materials, the reaction rate, and so on within a predetermined range. In this case, the foaming material fed can be returned to a container through a similar piping. The foaming materials are discharged from the mixing head by pulling a cylinder via hydraulic pressure applied from a hydraulic pressure source at the time of discharging. At this time, a circulating pathway is configured so as to be blocked or to restrict a flow rate thereof. To suspend the discharge of the foaming material, the hydraulic pressure is controlled to return the cylinder with an electromagnetic valve by use of a timer or the like. (In this case, the hydraulic pressure is set to 150-200 kg per square meter. The amount of discharging the foaming materials may be adjusted to is 5,000 cc per minute. The nozzle size of an injecting nozzle of the mixing head is adjusted so as to set the pressure at the time of discharging the respective foaming materials to 75 to 150 km·f/cm². The amount of injecting the two-pack foaming materials is set so that the filling volume after foaming is present in an amount of 3,300 cc.

Performance Tests (1) Injecting Performance:

When the injection frame $1d$ is injected and filled completely to the depth of 100 mm from the bottom, the result is indicated by symbol "O". On the other hand, symbol "X" is indicated where it is not injected and filled completely.

(2) Leaking or Expanding Performance:

When the cured urethane foam is leaked and expanded in the length of 50 mm or larger from the gap $6d$ of the injection frame $1d$, the test result is indicated as symbol "X". On the other hand, when it is not leaked so much, the test result is indicated as symbol "O".

TABLE 2

| Polyols *1 (Hydroxyl group value) | EXAMPLES | | COMPARATIVE EXAMPLE 1 |
|---|---|---|---|
| | 1 | 2 | |
| Polyol A (560) | — | 25 | — |
| Polyol B (240) | 50 | 25 | 50 |
| Amine compound | — | 3 | — |
| Foaming agent (water) | 2 | 0.1 | 2 |
| Catalyst | 1 | 1 | 0.2 |
| Curing agent | 62 | 62 | 62 |
| Cream time (seconds) | Within 3 | Within 3 | 10 |
| Rise time (second) | 15 | 30 | 60 |
| Injecting performance | O | O | O |
| Leaking performance | O | O | X |

In table 2:
*1 Polyol A: Polyether triol (trimethylol propane base) of Sannyo Kasei Kogyo K.K.; Trade name "SANNIX ™ TE-300"
Polyol B: Polyether triol (trimethylol propane base) of Sannyo Kasei Kogyo K.K.; Trade name "SANNIX ™ TP-700"

From the test result as shown in Table 2 above, it is found possible to carry out injection work for injecting the two-pack urethane foam composition even in the step close to finishing the assembly of a vehicle in the vehicle assembly line because the two-pack urethane foam composition does not cause any leaking outside and expanding and any sagging from the gap and so on of the closed sectional structure of the automobile by ensuring the predetermined cream time and rise time.

(Injecting Apparatus and Injecting Method for Injecting in Closed Structure of Vehicle Body with Manipulator)

The following is a description of an embodiment of the invention relating to the injecting apparatus and the injecting method for injecting and filling the closed sectional structure of the vehicle body with reference to FIGS. 13 to 20.

An embodiment of the invention relating to the injecting apparatus for injecting and filling the closed sectional structure of the vehicle body comprises a robot 10 acting as a manipulator movable to a desired location, an injector 50 mounted on the robot 10 for injecting a foaming material, a pump 56 acting as a supply member for supplying the foaming material, such as a two-pack urethane foam composition, to the injector 50, and a controller for controlling the position of the robot 10 so as to align the injector 50 with an injection port of the closed sectional structure of the vehicle body and controlling the pump 56 so as to inject and fill the two-pack urethane foam composition in the amount that can be set so as to comply with the volume of the closed sectional structure thereof.

Figure 13:
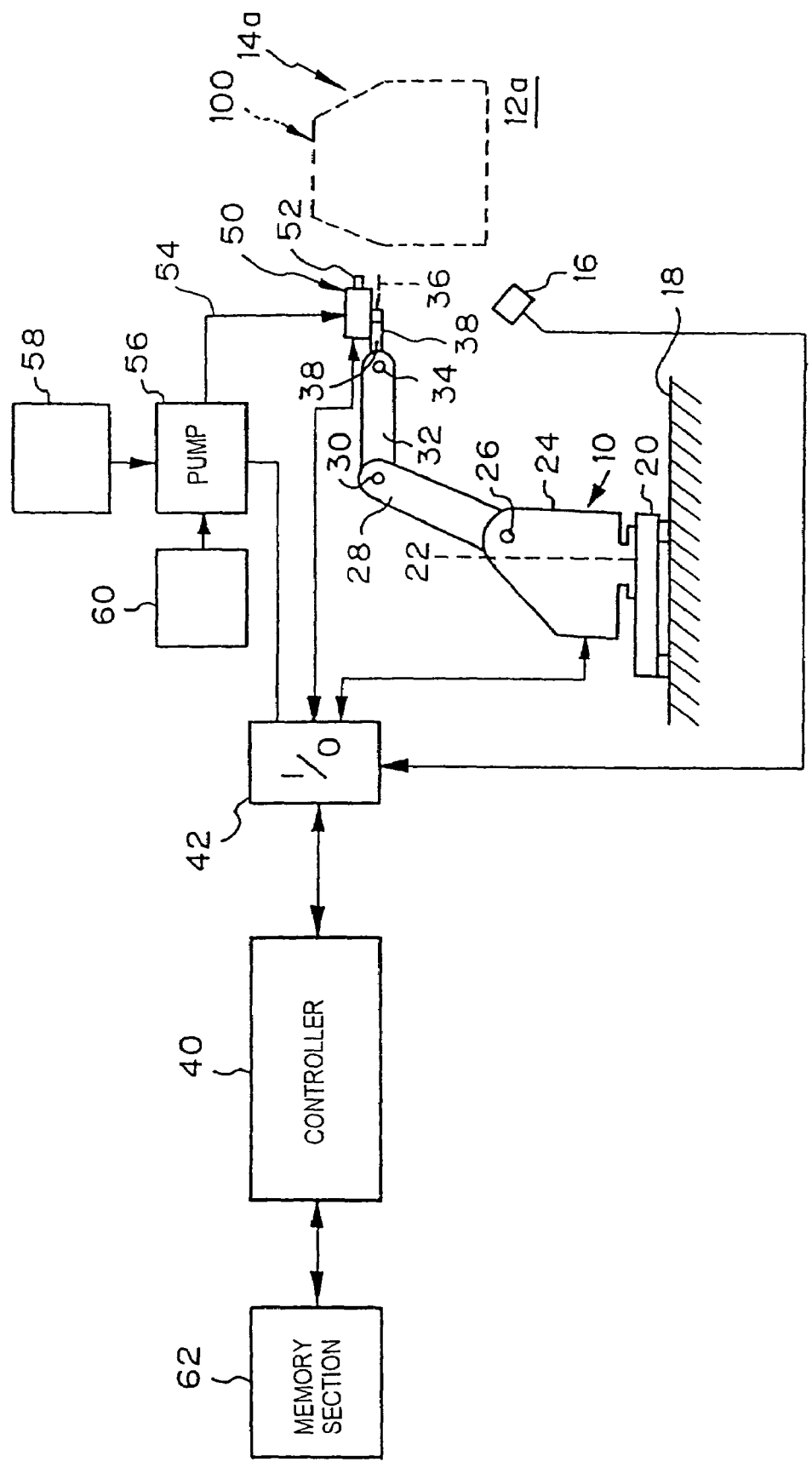
FIG. 13 is a block diagram showing a first embodiment of an injecting apparatus for the closed sectional structure of the vehicle body according to the present invention.

In this embodiment, the robot 10 of FIG. 13 comprises the manipulator as described above. The robot 10 is disposed at a work 14*a* along an automobile assembly line 12*a*. A detector 16 is disposed in a position close to the robot 10 so as to sense the entry of a vehicle body (e.g., a white body) 100 into the work 14*a*.

The robot 10 may comprise a base section 20 fixed on a floor 18 of a plant, a body section 24 mounted on the base section 20 so as to pivot about a longitudinal axis 22, a first arm section 28 mounted on the body section 24 so as to pivot about a transverse axis 26, a second arm section 32 mounted on the edge of the first arm section 28 so as to pivot about a transverse axis line 30, and a hand section 38 mounted on the edge of the second arm section 32 so as to pivot about a transverse axis 34 and mounted so as to rotate about a rotational axis 36.

With this configuration, as the vehicle body 100 is conveyed on the assembly line 12*a* and reaches a position close to the robot 10, the detector 16 detects it and sends a signal to a controller 40 through an input/output (I/O) unit 42 that the vehicle body enters into the work 14*a*. Then, the controller 40 gives an instruction to the robot 10 through the I/O unit 42 on the basis of the signal. Then, the body section 24 is operated to pivot with respect to the base section 20 on the basis of the instruction, and the first arm section 28 is operated to pivot with respect to the body section 24. Further, the second arm section 32 is operated to pivot with respect to the first arm section 28, while the hand section 38 is operated to rotate or pivot with respect to the second arm section 32, thereby transferring the hand section 38 to a desired position.

The injector 50 is fixed to the tip side, i.e., the terminal end side, of the hand section 38. The injector 50 is provided with a discharging and injecting nozzle 52 directed to the assembly line 12*a*. The discharging and injecting nozzle 52 may be provided with an openable valve (not shown). By controlling the timing of opening this valve, the timing of starting discharging the foaming material (hereinafter, a two-pack urethane foam composition being used in this embodiment) can be controlled in a more accurate way. Further, by controlling the timing of closing the valve after discharging the two-pack urethane foam composition, an extension of the two-pack urethane foam composition after discharging can be prevented effectively. This valve may comprise part of the supply system. The injector 50 is connected to a pair of pumps 56 (in the drawing, they are indicated as one pump) through a conduit 54, and the pair of the pumps 56 are in turn connected to tanks 58 and 60, respectively. The tank 58 is stored with the major component (e.g., a polyol compound), and the tank 60 is stored with the curing agent (e.g., a polyisocyanate curing compound). Each of the major compound and the curing agent for the two-pack urethane foam composition is supplied separately to the injector 50 under pressure through the pair of the pumps 56, and the two-pack compositions are mixed therein upon impact, followed by discharging the foaming material from the discharging and injecting nozzle 52.

Figure 14:
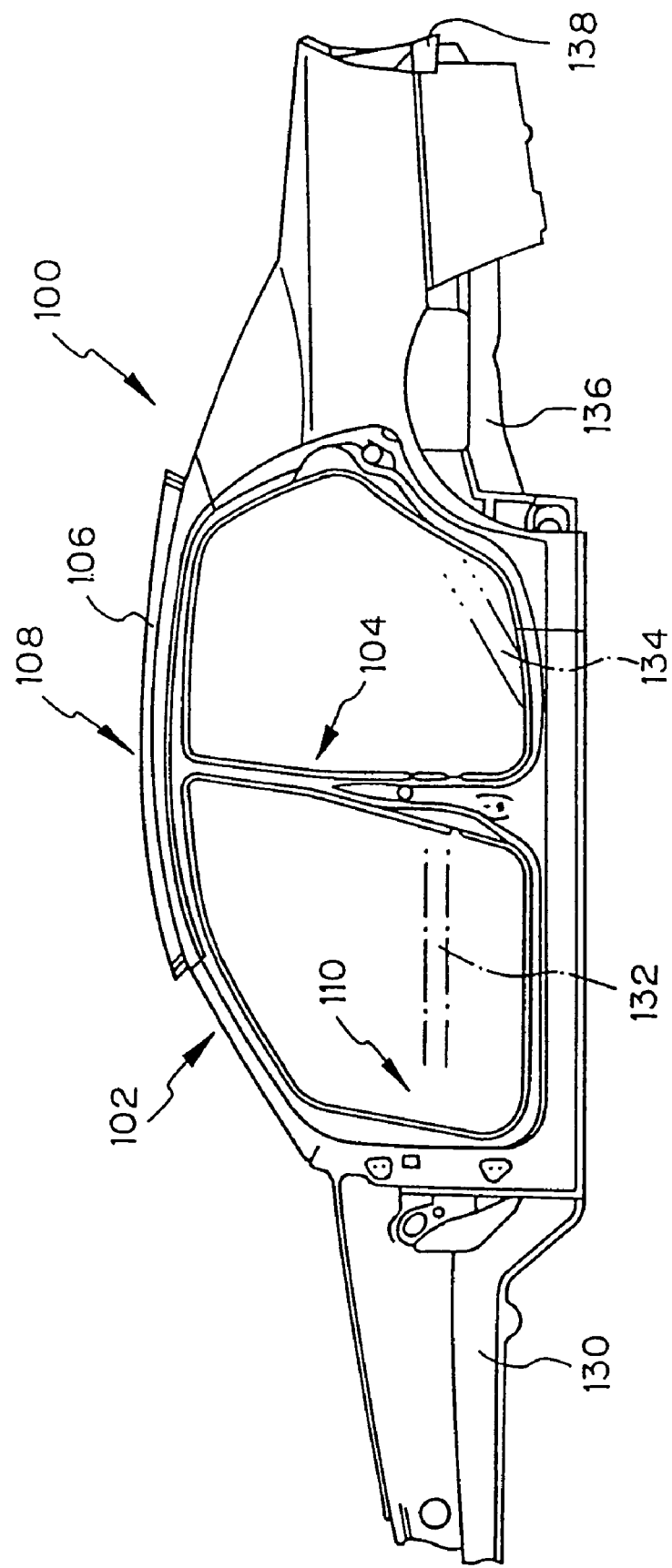
FIG. 14 is a side view showing a vehicle body as an object for injecting and filling with the injecting apparatus of FIG. 13.

On the automobile assembly line 12*a*, vehicle bodies 100 are conveyed in sequence in a spaced relationship apart in a predetermined distance, as shown in FIGS. 13 and 14. In FIG. 13, the vehicle body 100 is indicated briefly as a box-shaped figure by dot line in order to clearly indicate the feature of this embodiment. The vehicle body 100 is indicated so as to flow with its head directed forehand. In this embodiment, for instance, the vehicle body 100 may comprise a pillar A section 102, a pillar B section 104, a pillar B upper section 108 constituting part of a roof section 106 disposed on the upper side of the pillar B section 104, and a locker section 110. Each of these sections may constitute a closed sectional structure of the vehicle body (in other words, a closed space structure of the vehicle body). It is to be noted herein, however, that the closed sectional structure is not limited to those sections, and such a closed sectional structure of the vehicle body may be constituted by a front side member 130, a side impact bar 132 to be mounted on a door, a cross member 134, a rear side member 136, and a bumper reinforcement 138, among other portions.

The robot 10 as shown in FIG. 13 is particularly designed so as to adapt to discharge and inject the two-pack urethane foam composition in the inside of the closed sectional structure of the pillar A section 102, the pillar B section 104, the pillar B upper section 108, and the locker section 110, which are disposed on the right side when looked at FIG. 13 (or on the side indicated in FIG. 14). Another robot (although not shown) is disposed on the opposite side of the robot 10 as shown in FIG. 13 in order to discharge and inject the two-pack urethane foam composition in the closed sectional structure of the pillar A section 102, the pillar B section 104, the pillar B upper section 108, and the locker section 110, which are disposed on the left side when looked at FIG. 13. When a robot is disposed as a manipulator in a manner as hanging from the ceiling, it can be transferred on both sides of the vehicle body so that the filling of the foaming material can be carried out with only one robot.

Figure 15:
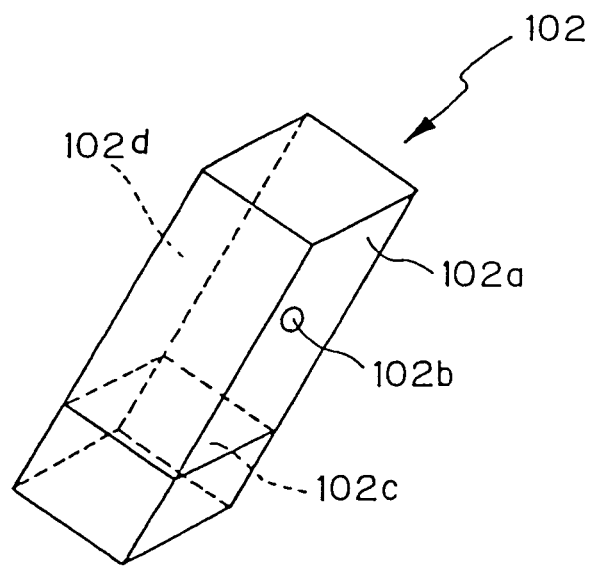
FIG. 15 is a schematic perspective view showing a pillar A portion of the vehicle body of FIG. 14.

The pillar A section 102 is provided with an injection port 102*b* opening toward the cabin side in a side wall 102*a* on the cabin side thereof (as shown in FIG. 15). At a lower portion of the inside of the pillar A section 102 is mounted a partition wall 102*c* which in turn defines a closed sectional structure 102*d* inside of the pillar A section 102 (in other words, a closed space structure 102*d* of the vehicle body). The closed sectional structure 102*d* serves as preventing the injected two-pack urethane foam composition from leaking and expanding into other locations. The injection port 102*b* is disposed so as to communicate with the closed sectional structure 102*d* of the vehicle body.

Figure 16:
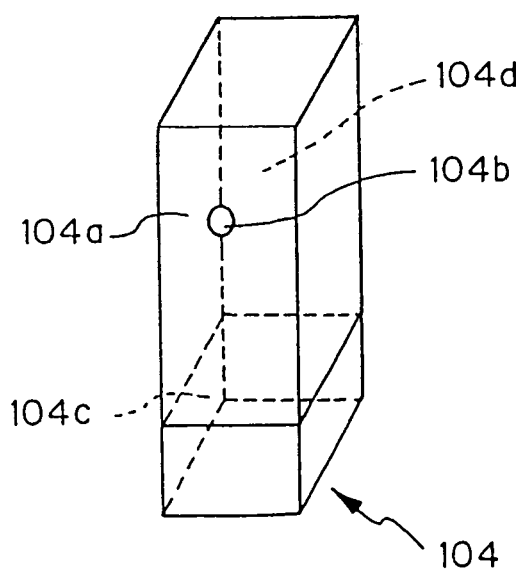
FIG. 16 is a schematic perspective view showing a pillar B portion of the vehicle body of FIG. 14.

The pillar B section 104 is provided with an injection port 104*b* opening toward the cabin side in a side wall 104*a* on the cabin side thereof (as shown in FIG. 16). At a lower portion of the inside of the pillar B section 104 is mounted a partition wall 104*c* which defines a closed sectional structure 104*d* inside of the pillar B section 104 (in other words, a closed space structure 104*d* of the vehicle body). The injection port 104*b* is disposed so as to communicate with the closed sectional structure 104*d* of the vehicle body.

Figure 17:
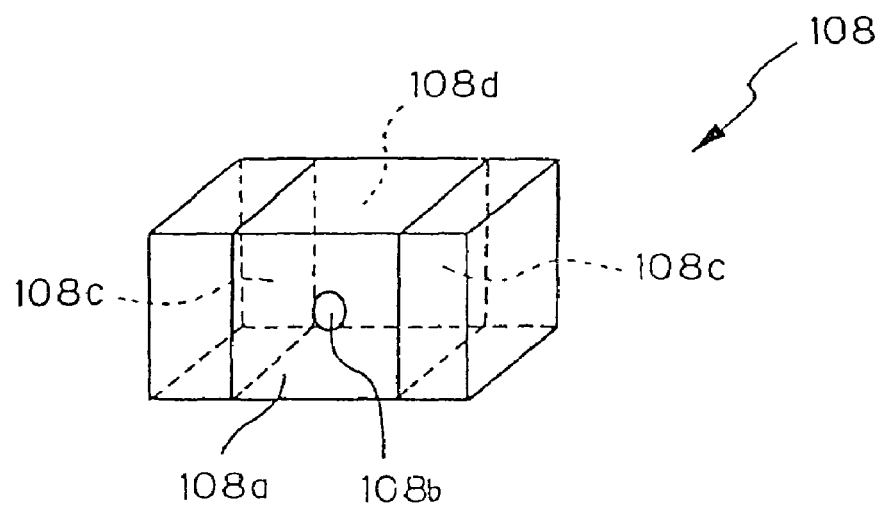
FIG. 17 is a schematic perspective view showing a pillar B upper portion of the vehicle body of FIG. 14.

The pillar B upper section 108 is provided with an injection port 108*b* opening toward the cabin side in a side wall 108*a* on the cabin side thereof (as shown in FIG. 17). At side portions of the inside of the pillar B upper section 108 are mounted partition walls 108*c* which define a closed sectional structure 108*d* inside of the pillar B upper section 108 (in other words, a closed space structure 108*d* of the vehicle body). The injection port 108*b* is disposed so as to communicate with the closed sectional structure 108*d* of the vehicle body.

Figure 18:
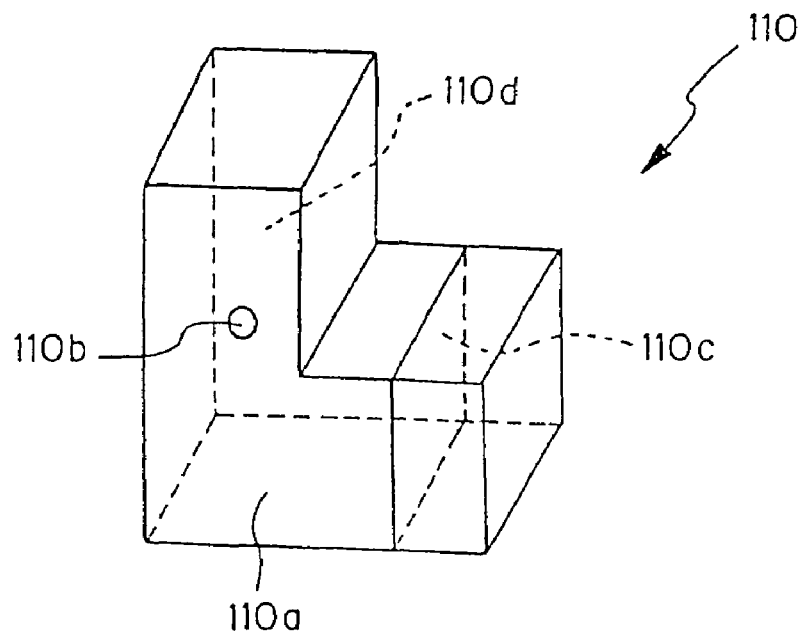
FIG. 18 is a schematic perspective view showing a locker portion of the vehicle body of FIG. 14.

The locker section 110 is provided with an injection port 110*b* opening toward the cabin side in a side wall 110*a* on the cabin side thereof (as shown in FIG. 18). At a side portion of the inside of the locker section 110 is mounted a partition wall 110*c* which in turn defines a closed sectional structure 110*d* inside of the locker section 110 (in other words, a closed space structure 110*d* of the vehicle body). The injection port 110*b* is disposed so as to communicate with the closed sectional structure 110*d* of the vehicle body.

In this embodiment, there may be selected any position in which the discharging and injecting nozzle 52 can be engaged with the injection port, as the position in which the two-pack urethane foam composition can be injected and filled in the closed sectional structure of the vehicle body through the injection port of the closed sectional structure thereof. With this configuration, the leakage of the foaming material between the injection port and the discharging and injecting nozzle can be prevented completely. It is to be noted, however, that, if there is no risk that the two-pack urethane foam composition leaks or expands, the injection port may simply be aligned with the discharging and injecting nozzle or only a tip portion of the discharging and injecting nozzle 52 may simply be inserted into the injection port.

The controller 40 is connected to a memory section 62. The memory section 62 is provided with a control program for controlling the robots. Moreover, it is provided with, for example, space coordinates of a first reference position in which the discharging and injecting nozzle 52 is engaged with the injection port 104*b* of the pillar B section 104, space coordinates of a second reference position in which the discharging and injecting nozzle 52 is engaged with the injection port 108*b* of the pillar B upper section 108, space coordinates of a third reference position in which the discharging and injecting nozzle 52 is engaged with the injection port 102*a* of the pillar A section 102, space coordinates of a fourth reference position in which the discharging and injecting nozzle 52 is engaged with the injection port 110*b* of the locker section 110, and so on.

The controller 40 is configured such that, on the basis of instruction from the control program stored in the memory section 62, it reads the space coordinates of the first reference position from the memory section 62 and starts driving the robot 10 to transfer the discharging and injecting nozzle 52 to the space coordinates of the first reference position and engage the discharging and injecting nozzle 52 with the injection port 104*b* of the pillar B section 104. After the discharging and injecting nozzle 52 has been aligned in the manner as described above, the pump 56 is driven to supply the two-pack urethane foam composition in the amount set so as to correspond to the volume of the closed sectional structure 104*d* of the pillar B section 104. Then, the controller 40 reads the space coordinates of the second reference position from the memory section 62 to drive the robot 10, thereby transferring the discharging and injecting nozzle 52 to the space coordinates of the second reference position and engaging the discharging and injecting nozzle 52 with the injection port 108*b* of the pillar B upper section 108. Thereafter, the pump 56 is driven to inject and fill the two-pack urethane foam composition in the amount that is set so as to comply with the volume of the closed sectional structure 108*d* of the pillar B upper section 108. Thereafter, the controller 40 reads the space coordinates of the third reference position from the memory section 62 to drive the robot 10, thereby transferring the discharging and injecting nozzle 52 to the space coordinates of the third reference position so as to engage with the injection port 102*a* of the pillar A section 102 and thereafter injecting and filling the two-pack urethane foam composition in the amount that can comply with the volume of the closed sectional structure 102*d* of the pillar A section 102. Then, the controller 40 reads the space coordinates of the fourth reference position from the memory section 62 to drive the robot 10, followed by transferring the discharging and injecting nozzle 52 to the space coordinates of the fourth reference position and engaging the discharging and injecting nozzle 52 with the injection port 110*b* of the locker section 110 to inject and fill the two-pack urethane foam composition in the amount corresponding to the volume of the closed sectional structure 110*d* of the locker section 110.

As the injecting and filling of the vehicle body 100 for one automobile with the two-pack urethane foam composition has been finished, the controller 40 returns the robot 10 to a home position so as to allow the hand section 38 to fail to block the way of the vehicle body 100 and wait for another vehicle body coming.

Figure 19:
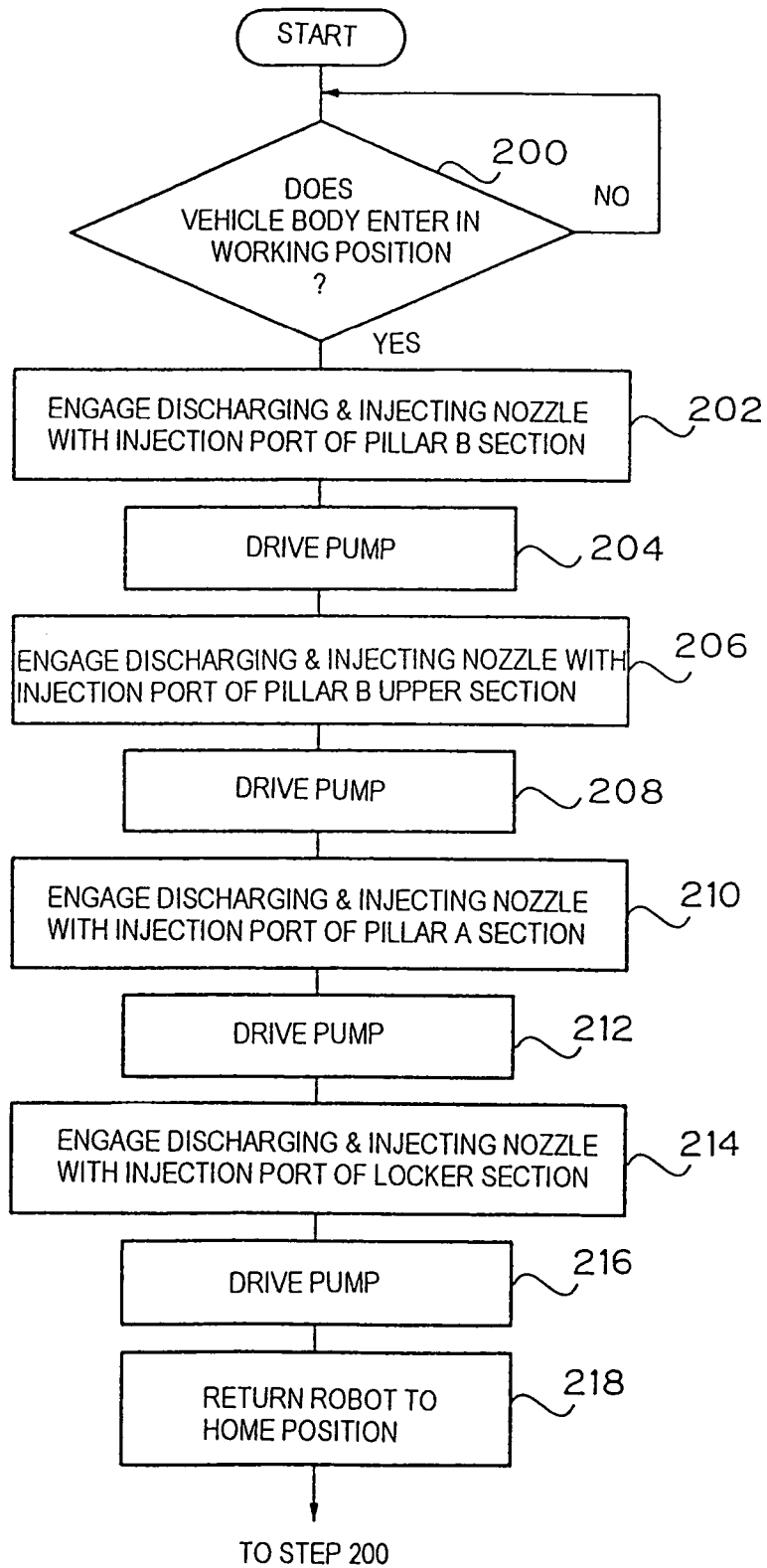
FIG. 19 is a flowchart for controlling the injecting apparatus of FIG. 13.

Next, a description will be made of an outline of the overall procedures for assembly of a vehicle body in this embodiment with reference to the flowchart of FIG. 19.

First, it is judged whether the detector 16 detects that the vehicle body 100 enters into the work 14*a* (at step 200). The detector 16 waits for another vehicle body 100 entering into the work 14*a* when the vehicle body 100 enters into the work 14*a*. As the detector 16 detects that the vehicle body 100 has entered into the work 14*a*, then the robot 10 is driven and the discharging and injecting nozzle 52 is transferred to the space coordinates of the first reference position and engaged with the injection port 104*b* of the pillar B section 104 (at step 202). Thereafter, a pair of the pumps 56 for the major component and the curing agent are driven so as to permit the two-pack urethane foam composition to be injected and filled in the amount corresponding to the volume of the closed sectional structure 104*d* of the pillar B section 104 (at step 204). Then, the robot 10 is driven to transfer the discharging and injecting nozzle 52 to the space coordinates of the second reference position, followed by engaging the discharging and injecting nozzle 52 with the injection port 108*b* of the pillar B upper section 108 (at step 206) and then driving the pair of the pumps 56 to inject and fill the two-pack urethane foam composition in the amount set so as to comply with the volume of the closed sectional structure 108*d* of the pillar B upper section 108 (at step 208). Further, the robot 10 is driven to transfer the discharging and injecting nozzle 52 to the space coordinates of the third reference position and engage it with the injection port 102*a* of the pillar A section 102 (at step 210), followed by driving the pair of the pumps 56 to inject and fill the two-pack urethane foam composition in the amount set so as to comply with the volume of the closed sectional structure 102*d* of the pillar A section 102 (at step 212). Thereafter, the robot 10 is driven to transfer the discharging and injecting nozzle 52 to the space coordinates of the fourth reference position and engage it with the injection port 110*b* of the locker section 110 (at step 214), followed by driving the pair of the pumps 56 to inject and fill the two-pack urethane foam composition in the amount set so as to comply with the volume of the closed sectional structure 110*d* of the locker section 110 (at step 216).

Thereafter, the robot 10 is returned to its home position (at step 218) to wait for another vehicle body entering.

In this embodiment, the system is arranged to inject and fill the two-pack urethane foam composition in the pillar B section 104, the pillar B upper section 108, the pillar A section 102 and the locker section 110 in this order. It is to be noted herein that the present invention is not limited to this order and it can be set so as to fill it in any optional order. It can be noted, however, that, when the two-pack urethane foam composition is arranged to be injected and filled in the order of the pillar B section 104, the pillar B upper section 108, the pillar A section 102 and the locker section 110 or in the reverse order, the area of transferring the hand section 38 of the robot 10, etc. can be minimized, thereby carrying out the injecting work in a short time.

Figure 20:
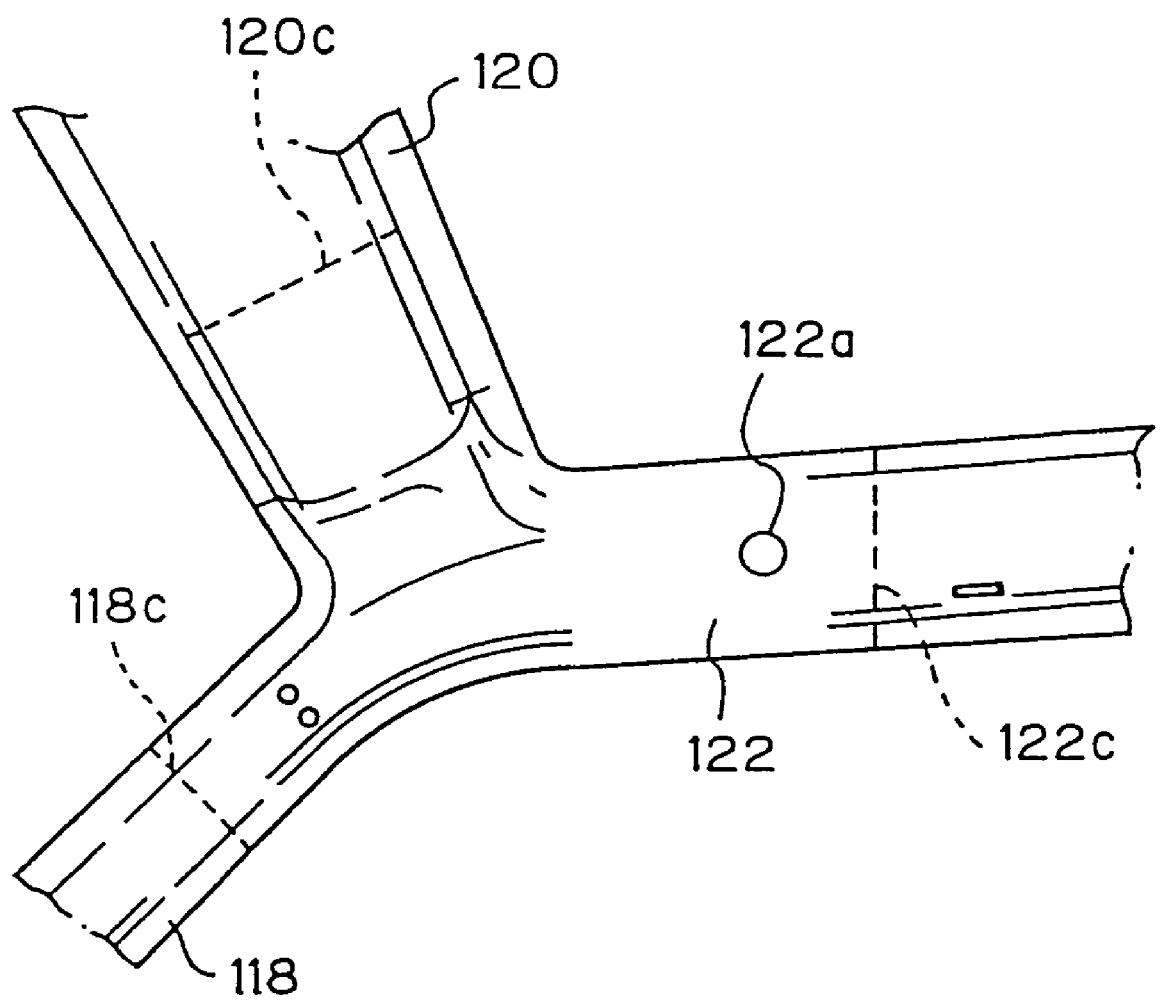
FIG. 20 is a perspective view showing a portion connecting the above pillar A portion, a front roof rail portion and a front side roof rail portion.

In this embodiment, too, the system is arranged so as to inject and fill the two-pack urethane foam composition in the closed sectional structure of each of the pillar B section 104, the pillar B upper section 108, the pillar A section 102 and the locker section 110 of the vehicle body; however, the present invention is not limited to the such vehicle body, and the two-pack urethane foam composition can be injected and filled in the closed sectional structure of, e.g., a pillar C section, a connecting part of a pillar section and a roof section, a side sill, a chassis section at the bottom portion of the vehicle body, a front side member, a side impact bar, a cross member, a rear side member, a bumper reinforcement, and any other section. FIG. 20 shows examples of a connecting part including a connecting part of e.g., a pillar A section 118, a front roof rail section 120, and a front side roof rail section 122. The pillar A section 118, the front roof rail section 120, and the front side roof rail section 122 are installed with partition walls 118*c*, 120*c* and 122*c*, respectively, to each define a closed sectional structure. An injection port 122*a* is formed in the front side roof rail section 122, and the two-pack urethane foam composition is injected and filled in the closed sectional structure through the injection port 122*a*. In this embodiment, the front side roof rail section 122 is provided with the injection port. It is to be noted; however, that an injection port may be formed in the pillar A section 118 or the front roof rail section 120.

Figure 21:
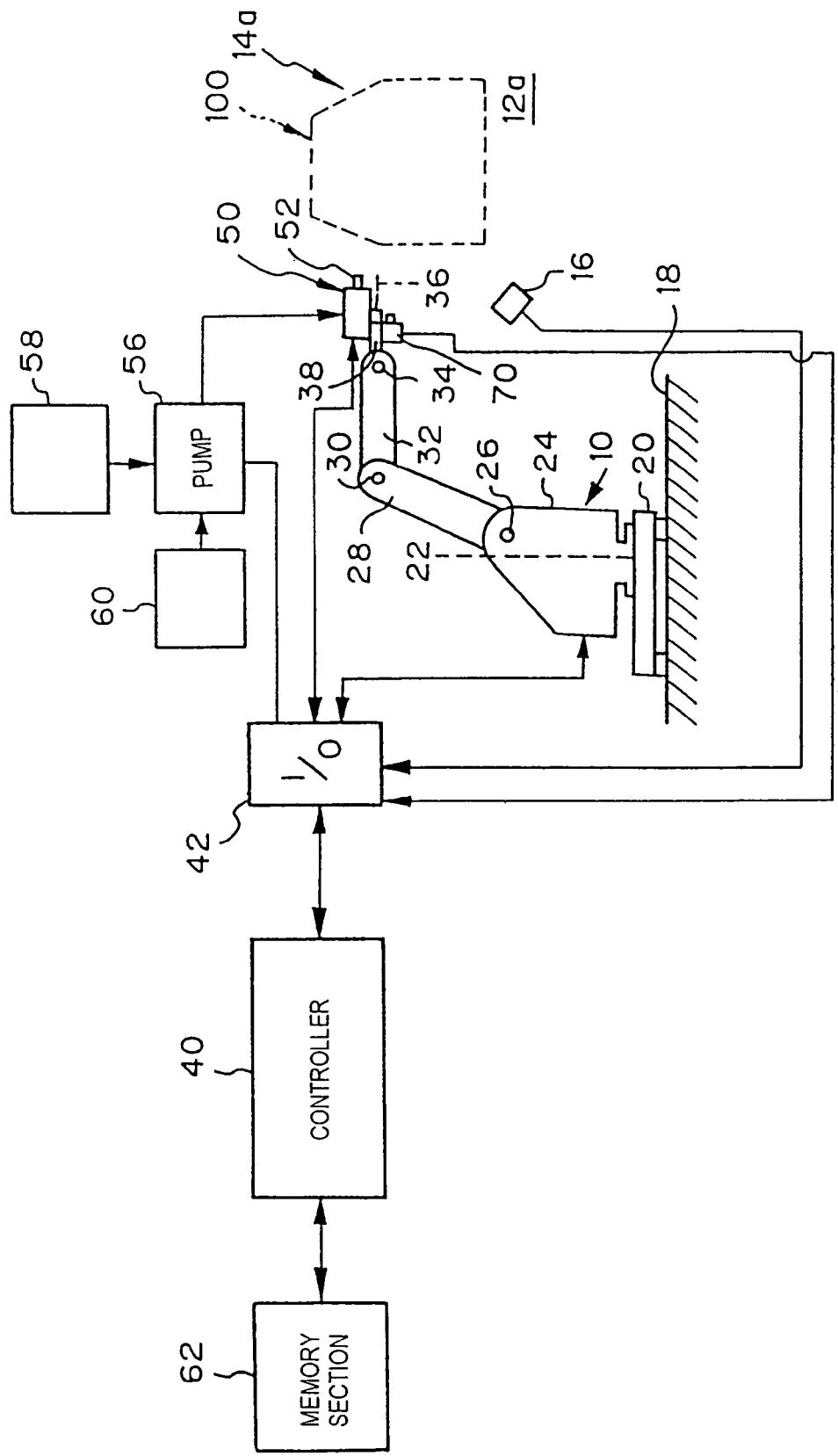
FIG. 21 is a block diagram showing an injecting apparatus for the closed sectional structure of the vehicle body in accordance with a second aspect of the present invention.

Next, a description will be made of a second aspect relating to the injecting apparatus for injecting and filling the two-pack urethane foam composition in the closed sectional structure of the vehicle body with reference to FIG. 21. It is noted herein that the same structural elements as the above embodiment are provided with the same reference numerals and symbols, and a duplicate description on the details thereof will be omitted hereinafter.

In this embodiment, as described above, the discharging and injecting nozzle 52 is arranged so as to be transferred to the four reference positions after it is engaged with the injection ports of the pillar B section, the pillar B upper section, the pillar A section, and the locker section. In other words, the arm of the robot 10 and so on are arranged so as to be equally transferred on the basis of the position of the vehicle body 100 being conveyed on the assembly line relative to the robot 10.

If the relative position would be deviated due to a strain of an individual vehicle body or an error would be caused to occur on the assembly line due to a deviation of the position, however, there would be the possibility that the discharging and injecting nozzle 52 could not be engaged with the injection port if the robot 10 would be controlled so as to be aligned in such an equal manner. In order to avoid an occurrence of such a problem, the present invention in the second embodiment is configured such that a position detecting sensor sensing an amount of deviation between the discharging and injecting nozzle 52 and the injection port of the closed sectional structure of the vehicle body may be provided. The position detecting sensor sends the amount of deviation to the controller 40, and the controller 40 adjusts the position of the hand section, the arm section, and the like, so as to make the amount of deviation zero.

The position detecting sensor may be mounted on the hand section 38 and comprise a CCD camera 70 as an image pickup tube for picking up an image of the injection port of the closed sectional structure of the vehicle body, the memory section 62 for storing a reference image of the injection port, and the controller 40 acting as a detecting section for detecting an amount of deviation between the discharging and injecting nozzle 52 and the injection port by comparing an image of the injection port outputted from the CCD camera 70 with a reference image saved in the memory section 62.

The memory section 62 is arranged to save (1) a first reference image of the injection port 104*b* of the pillar B section 104 obtained by the CCD camera 70 when the discharging and injecting nozzle 52 is transferred to the first reference position; (2) a second reference image of the injection port 108*b* of the pillar B upper section 108 obtained by the CCD camera 70 when the discharging and injecting nozzle 52 is transferred to the second reference position; (3) a third reference image of the injection port 102*a* of the pillar A section 102 obtained by the CCD camera 70 when the discharging and injecting nozzle 52 is transferred to the third reference position; and (4) a fourth reference image of the injection port 110*b* of the locker section 110 obtained by the CCD camera 70 when the discharging and injecting nozzle 52 is transferred to the fourth reference position; when there is found no deviation for the vehicle body 100.

Figure 22:
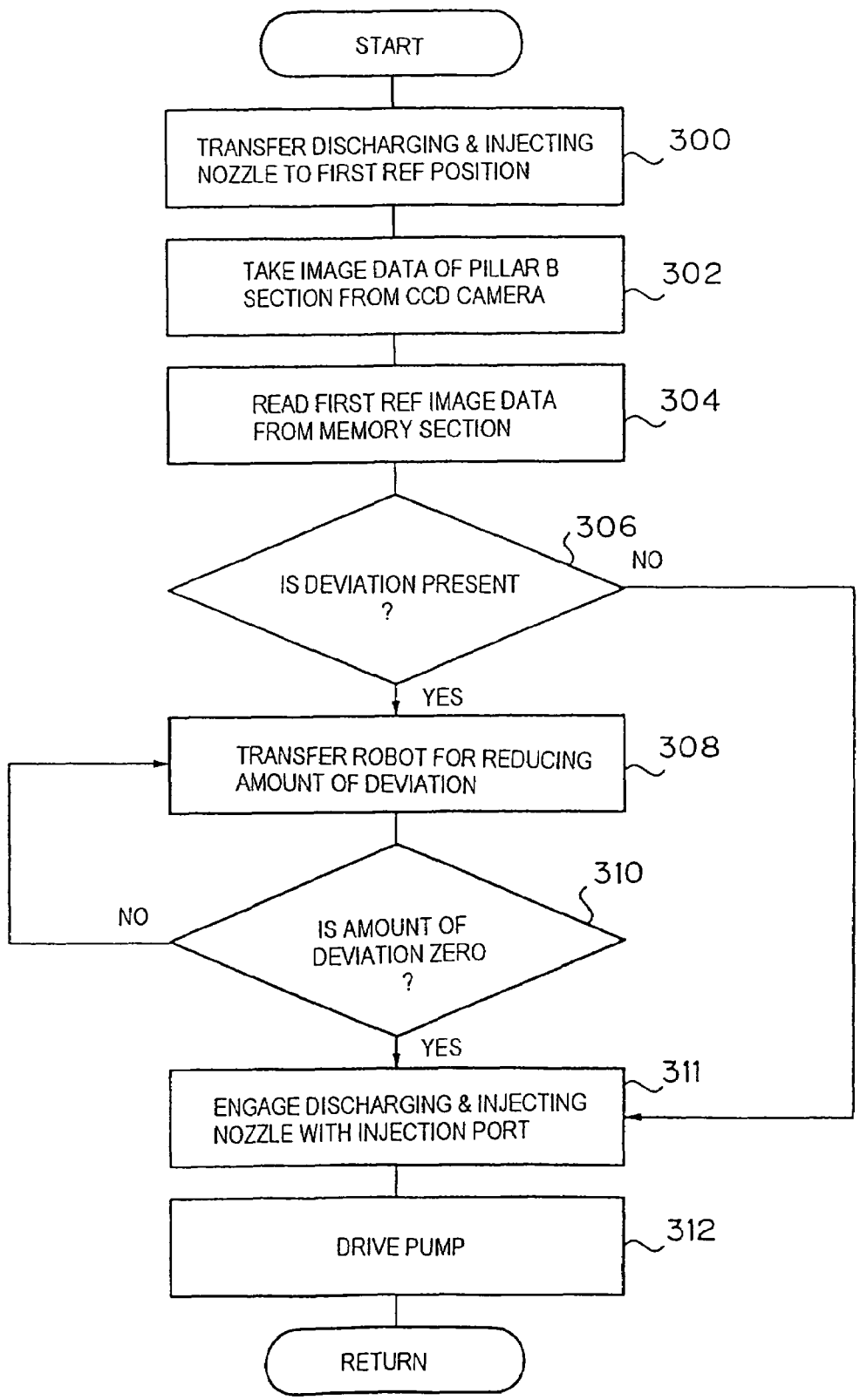
FIG. 22 is a flowchart for controlling the injecting apparatus of FIG. 21.

Now, a description will be made of the injecting method according to the present invention by taking the case of engaging the discharging and injecting nozzle 52 with the injection port 104*b* of the pillar B section 104 as an example. As shown in FIG. 22, first, the controller 40 transfers the discharging and injecting nozzle 52 to the first reference position in which the discharging and injecting nozzle 52 can be engaged with the injection port 104*b* of the pillar B section 104 (at step 300). At this time, the controller 40 takes image data of the injection port 104*b* of the pillar B section 104 from the CCD camera 70 (at step 302) and reads the first reference image data of the injection port of the pillar B section from the memory section 62 (at step 304). Moreover, the controller 40 checks whether the discharging and injecting nozzle 52 deviates from the injection port by comparing the first reference image data with the image obtained from the CCD camera 70 (at step 306). If it is found that there is a deviation, the hand section 38 of the robot 10 and so on are transferred in the direction in which the amount of deviation is decreased (at step 308). When it has been confirmed that the amount of deviation has been made zero (at step 310), then the discharging and injecting nozzle 52 is engaged with the injection port 104*b* (at step 311), and the pumps 56 are driven to start injecting and filling the two-pack urethane foam composition (at step 312). On the other hand, when it is found that there is no deviation between the first reference image data of the injection port of the pillar B section and the image obtained from the CCD camera at step 306, then the discharging and injecting nozzle 52 is engaged with the injection port 104*b* and the pumps 56 are then driven to start injecting and filling the two-pack urethane foam composition. Concerning the other injection ports, the discharging and injecting nozzle 52 is engaged with the corresponding injection port after the image of the injection port obtained by the CCD camera is compared with the corresponding reference image and the deviation, if some, is processed so as to become zero, in the same manner as described above. Then, the discharging and injecting nozzle 52 is engaged with the injection port and the two-pack urethane foam composition is injected and filled. It is preferred that the flowchart as shown in FIG. 22 is incorporated as a sub-routine of the main flow chart of FIG. 21.

In accordance with the second aspect as described above, the discharging and injecting nozzle can be engaged with the injection port of the closed sectional structure of a vehicle body in an accurate way even if the position of alignment of the vehicle body or the like would deviate.

Next, a description will be made of the invention relating to the injecting apparatus for the closed sectional structure of a vehicle body on the basis of FIG. 23. In the drawing, the same structural elements as those of the above embodiments are provided with the same reference numerals and symbols, and a duplicate description on the details thereof will be omitted.

Figure 23:
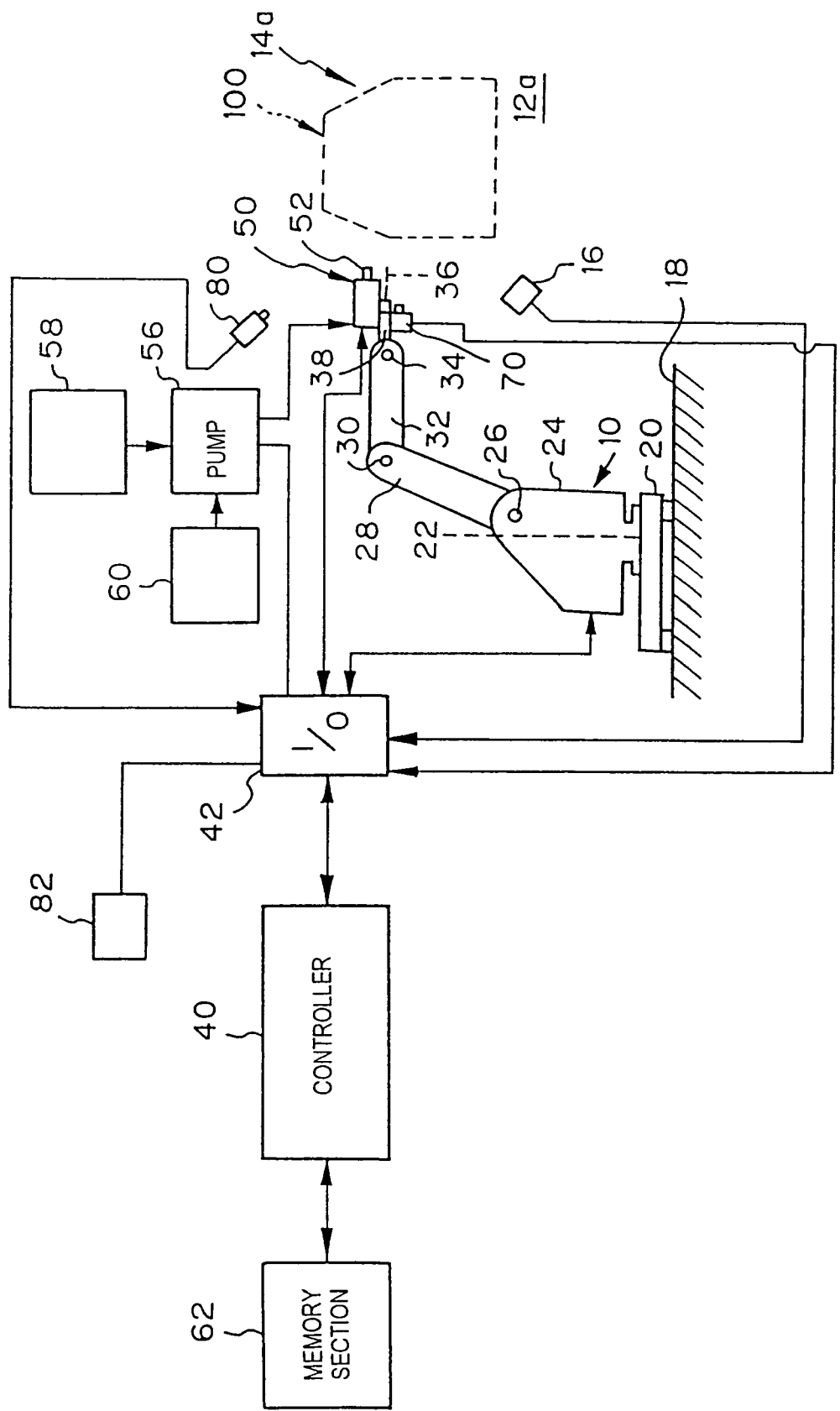
FIG. 23 is a block diagram showing an injecting apparatus for the closed sectional structure of the vehicle body in accordance with a third aspect of the present invention.

In this third aspect, as shown in FIG. 23, the injecting apparatus according to the present invention further comprises a monitor device for monitoring a foamed state and a cured state of the two-pack urethane foam composition filled inside of the closed sectional structure. The two-pack urethane foam composition is allowed to foam and cure while it is causing a rapid exothermic reaction immediately after the major component and the curing agent have been mixed together. The monitor device is to monitor the temperature on the surface of the closed sectional structure of the vehicle body with the foaming material injected and filled therein. The monitor device may comprise an infrared camera 80 for monitoring the foamed state of the two-pack urethane foam composition filled in the closed sectional structure of the vehicle body and a thermal image unit for converting a signal of the temperature from the infrared camera 80 into a thermal image data and display the resulting thermal image. The thermal image unit may comprise the controller 40 for converting the signal of temperature from the infrared camera 80 into thermal image data and a display unit 82 for displaying thermal image data from the controller 40. The infrared camera 80 of FIG. 23 is fixed in any optional position so as to monitor the pillar B section on the right side when viewing FIG. 23. Another infrared camera for monitoring the closed sectional structure of another vehicle body is omitted.

The display unit 82 is configured to display the filled site and the non-filled site of the two-pack urethane foam composition by a temperature difference between the two sites. With this configuration, the operator can detect the non-filled site in the closed sectional structure of the vehicle body where the two-pack urethane foam composition is not filled and filled, by monitoring the display unit 82. If the non-filled site is detected, then the operator can treat the vehicle body with the non-filled site present in the closed sectional structure as no good. As the method for confirmation on the basis of a temperature difference as to whether the filling volume is appropriate or not, there may be used the embodiment relating to the cured urethane foam-filling confirming method among the series of the invention as described above.

In monitoring the cured state that is the state in which the foamed state is subjected to cool and cure, a tapping-type non-destructive examination device may be used. The tapping-type non-destructive examination device is a device for automating the tapping operation, in which the judgment of a tone and sensitivity is replaced with a force sensor and a CPU, installed in a hammer, and the judgement is quantified by digital processing. The monitor device for use in the present invention may comprise a device in combination of the tapping-type non-destructive examination device for monitoring the cured state within the closed sectional structure of the vehicle body with a device for converting and displaying a tapping wave from the tapping-type non-destructive examination device.

Figure 24:
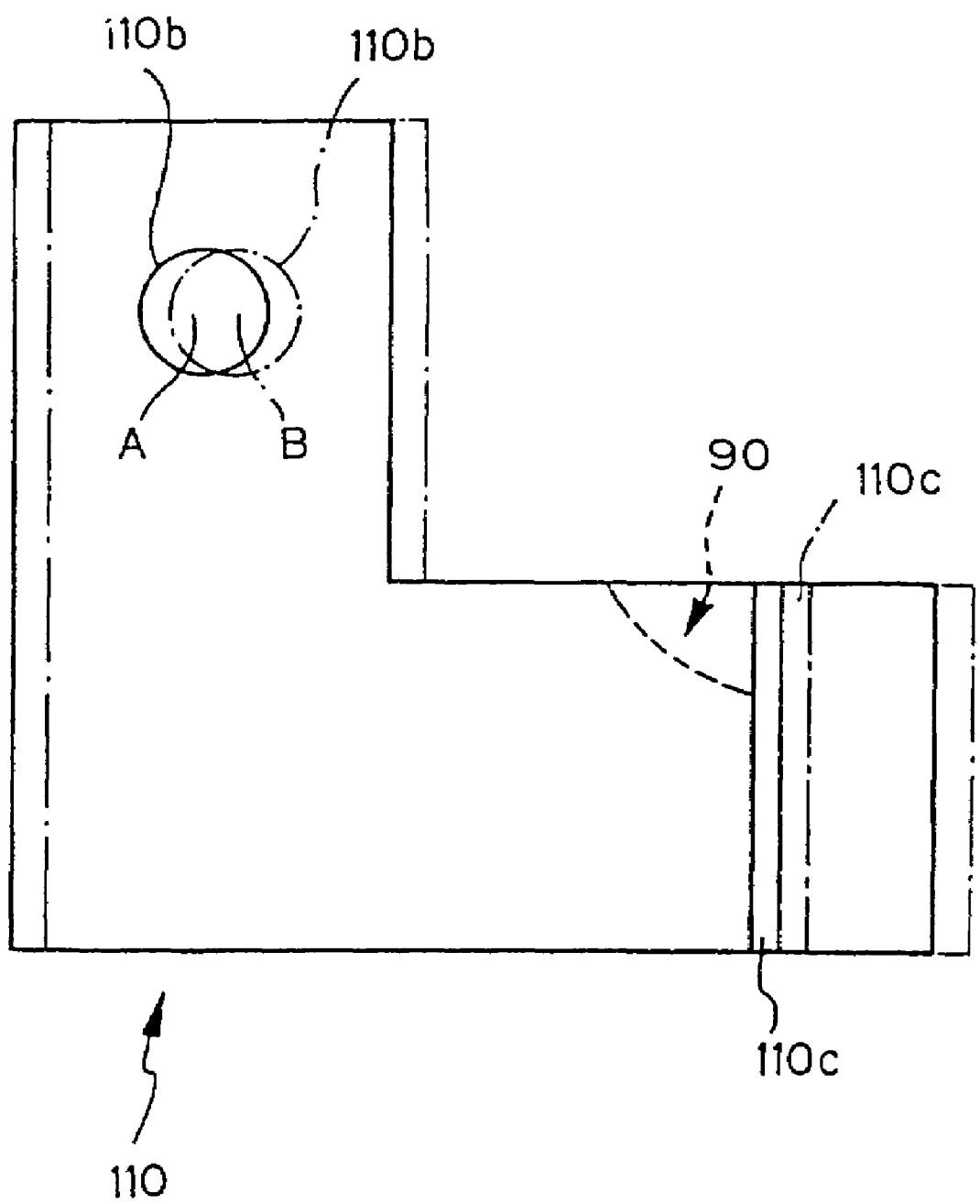
FIG. 24 is a schematic view showing a method for correcting a reference image of an injection port.

When the monitor device has monitored the non-filled site with the two-pack urethane foam composition not filled and filled within the closed sectional structure of the vehicle body, the reference image of the injection port can be corrected in accordance with the position of the non-filled site. More specifically, even if the discharging and injecting nozzle 52 would be engaged with the injection port 110*b* of the locker section 110 in the state in which it is aligned with the central point A of the injection port 110*b* thereof, there may be caused to occur the occasion that the non-filled site 90 appears at an upper right corner in the vicinity of the partition wall 110*c* as shown in FIG. 24. It may be considered that such a defect is caused to happen due to a deviation of the quality of the vehicle body or for other reasons. In this case; however, the occurrence of the non-filled site 90 can be prevented by shifting the position of the discharging and injecting nozzle 52 to a shift point B to the side somewhat closer toward the non-filled site from the central point A of the injection port 110*b* in the range in which the discharging and injecting nozzle 52 can be engaged with the injection port 110*b*, and inserting the discharging and injecting nozzle 52 into the injection port at the shift point B. In this embodiment, in order to allow the discharging and injecting nozzle 52 to be inserted into the injection port 110*b* at the shift point B that has been somewhat shifted toward the non-injected site from the central point A of the injection port 110*b*, the corresponding reference image data saved in the memory section 62 is corrected by shifting the reference image of the locker section 110 containing the injection port to the right by the distance corresponding to the central point A and the shift point B, as indicated by dot-dash line in FIG. 24. By correcting the reference image data in the manner as described above, the discharging and injecting nozzle 52 can be inserted into the shift point B of the injection port on the reference image, that is, the injection port that is shifted somewhat toward the non-filled site from the central point A of an actual product. As the correction is made by shifting the reference image of the injection port, it is not required to change the control flowchart itself so that costs for production can be reduced. In accordance with this aspect, too, the injection port is formed so as to become somewhat wider in diameter so that a rubber formed member for preventing a back flow of the foaming material can be inserted tightly, the formed member being provided with a crosscut portion that can be inserted into the injection port. With this configuration, even if the discharging and injecting nozzle would be shifted somewhat in an optional direction from the central point of the injection port, it can offset the deviation of the position of the nozzle and the occurrence of the leakage or expanding of the two-pack urethane foam composition can be prevented.

The present invention can prevent the non-filled site from occurring by shifting the reference image of the injection port of the locker section in the manner as described above.

With the configuration as described above, the injecting apparatus according to the present invention can inject and fill the foaming material inside of the closed sectional structure of the vehicle body in association with the assembly line on which a large number of vehicle bodies are conveyed, because the injecting apparatus comprises the manipulator disposed so as to be transferred to a desired position, the injector mounted on the manipulator, the supply system for supplying the foaming material to the injector, and the controller adapted to control the position of the manipulator so that the injector can be aligned with the position in which the foaming material can be supplied to the closed sectional structure of the vehicle body through the injection port of the same closed sectional structure thereof, and also adapted to control the supply system so that the foaming material can be injected and filled in the closed sectional structure thereof by only such an amount that is set so as to comply with the volume of the inside of the closed sectional structure thereof.

The injecting apparatus according to the present invention further can align the injector with the injection port of the closed sectional structure of the vehicle body in an accurate way even if the vehicle body would be deviated from the manipulator because the injecting apparatus further comprises the position detecting sensor for detecting the amount of deviation between the injector, mounted on the manipulator and the injection port of the closed sectional structure thereof, wherein the position detecting sensor outputs the sensed amount of deviation to the controller and the controller adjusts the position of the manipulator so as to make the amount of deviation zero.

Moreover, the injecting apparatus according to the present invention may further comprise the monitor for monitoring the foamed state in the closed sectional structure of the vehicle body thereof so that a vehicle body with the non-filled site where no foaming material is injected and filled therein can be treated as a defective product when the monitor device has detected the non-filled site.

Furthermore, the injecting apparatus according to the present invention can reduce the occurrence of the non-filled site by correcting the reference image of the injection port in accordance with the position of the non-injected site, when the monitor device has detected the non-injected site where no foaming material is injected and filled in the closed sectional structure of the vehicle body.

The foregoing description is directed to the aspects of the invention, but it is to be understood that the present invention is not limited to the foregoing description and that it can encompass optional variations without departing from the scope and spirit of this invention. In addition, the present invention can encompass any combination of two or more aspects selected from the aspects of the invention.

For instance, by combining the aspect relating to the injecting apparatus for the closed sectional structure of the vehicle body with at least either one of the aspect relating to the two-pack urethane foam composition and the aspect relating to the injection method for injecting the two-pack urethane foam composition, the efficiency of a mass production of a large number of vehicle bodies can be further improved because the combined invention can prevent the injected material from leaking and expanding from the injection port and the two-pack urethane foam composition can be injected and filled in vehicle bodies in a large quantity in sequence.

In addition, when the above aspects relating to the cured urethane foam-filled vehicle body are applied to a vehicle body as an object for use with the injecting apparatus for the closed sectional structure of the vehicle body, the operator can confirm the filling volume of the urethane foam directly with the eye, without using the monitor device.

Furthermore, in accordance with the present invention, when the aspect relating to the injection process for injecting the two-pack urethane foam composition is applied to the aspect relating to the injecting apparatus for the closed sectional structure of the vehicle body, the cream time can be set to within 3 seconds and the rise time can be set to 10 to 120 seconds after the injection so that the leakage and expansion of the injected material can be prevented, and the clogging thereof during the injection process can be prevented, too. This can further improve efficiency of a mass production of vehicle bodies because this embodiment can efficiently inject and fill the two-pack urethane foam composition smoothly in a large quantity of vehicle bodies.

The invention claimed is:

1. A process comprising:
   injecting a two-pack urethane foam composition into a closed sectional portion of a vehicular body member, said closed sectional portion having a cured urethane foam-filling confirming opening, and said cured urethane foam-filling confirming opening being a hole extending through a wall of said closed sectional portion;
   foaming and curing said two-pack urethane foam composition within said closed sectional portion; and then
   viewing said cured urethane foam-filling confirming opening to confirm whether said closed sectional portion has been sufficiently filled by said two-pack urethane foam composition,
   wherein an opening dimension of said cured urethane foam-filling confirming opening is 10 mm or less to assure rigidity of said vehicular body member.

2. The process according to claim 1, wherein
   foaming and curing said two-pack urethane foam composition within said closed sectional portion results in the foamed and cured two-pack urethane foam composition existing within said closed sectional portion to a limit position, with said cured urethane foam-filling confirming opening being positioned from said limit position by at most 50 mm.

3. The process according to claim 2, wherein
   said cured urethane foam-filling confirming opening is positioned from said limit position by at most 30 mm.

4. The process according to claim 1, wherein said cured urethane foam-filling confirming opening is positioned from said limit position by at most 30 mm.

5. The process according to claim 4, wherein
   said opening dimension of said cured urethane foam-filling confirming opening is within a range of from 1 mm-7.5 mm.

6. The process according to claim 1, wherein
   injecting a two-pack urethane foam composition into a closed sectional portion of a vehicular body member comprises injecting said two-pack urethane foam composition through an injection port, with said injection port and said cured urethane foam-filling confirming opening being positioned on the same side of said closed sectional portion of said vehicular body member.

7. The process according to claim 6, wherein
   foaming and curing said two-pack urethane foam composition within said closed sectional portion results in the foamed and cured two-pack urethane foam composition existing within said closed sectional portion to a limit position, with said cured urethane foam-filling confirming opening being positioned from said limit position by at most 50 mm.

8. The process according to claim 7, wherein
   said cured urethane foam-filling confirming opening is positioned from said limit position by at most 30 mm.

9. The process according to claim 8, wherein
   said opening dimension of said cured urethane foam-filling confirming opening is within a range of from 1 mm-7.5 mm.

* * * * *

UNITED STATES PATENT AND TRADEMARK OFFICE
CERTIFICATE OF CORRECTION

PATENT NO. : 7,459,107 B2
APPLICATION NO. : 11/025152
DATED : December 2, 2008
INVENTOR(S) : Kiichi Yamashita et al.

It is certified that error appears in the above-identified patent and that said Letters Patent is hereby corrected as shown below:

On Title page 1, Section (73), Assignee, please insert:

--Sunstar Giken Kabsushiki Kaisha, Osaka (JP)--.

Signed and Sealed this
Sixth Day of March, 2012

David J. Kappos
*Director of the United States Patent and Trademark Office*